United States Patent
Nagayanallur Subramanian et al.

(10) Patent No.: US 11,537,574 B2
(45) Date of Patent: Dec. 27, 2022

(54) AUTONOMOUS DATABASE DEFRAGMENTATION

(71) Applicant: salesforce.com, inc., San Francisco, CA (US)

(72) Inventors: Suresh Nagayanallur Subramanian, Singapore (SG); Manzoor Ahamed Sulthan, Singapore (SG); Yoram Tal, San Francisco, CA (US); Kranthi Baddepuri, Hyderabad (IN); Subramanian Sathasivam, Singapore (SG); Dinesh reddy Parvata reddy, Hyderabad (IN); Praveen Kumar Rotam, Singapore (SG)

(73) Assignee: salesforce.com, inc., San Francisco, CA (US)

( * ) Notice: Subject to any disclaimer, the term of this patent is extended or adjusted under 35 U.S.C. 154(b) by 130 days.

(21) Appl. No.: 16/933,753

(22) Filed: Jul. 20, 2020

(65) Prior Publication Data

US 2022/0019565 A1    Jan. 20, 2022

(51) Int. Cl.
*G06F 16/22* (2019.01)
*G06F 16/215* (2019.01)
(Continued)

(52) U.S. Cl.
CPC ........ *G06F 16/215* (2019.01); *G06F 11/0772* (2013.01); *G06F 11/1092* (2013.01);
(Continued)

(58) Field of Classification Search
CPC .... G06F 16/22; G06F 16/122; G06F 16/2282; G06F 16/215; G06F 11/0772;
(Continued)

(56) References Cited

U.S. PATENT DOCUMENTS 9,928,210 B1 * 3/2018 Zhang ................. G06F 15/8084
11,119,668 B1 * 9/2021 Keller ..................... G06F 3/064
(Continued)

OTHER PUBLICATIONS

Spatial and Graph Developer's Guide, 17.2 Alter Index Rebuild; Oracle; https://docs.oracle.com/database/121/SPATL/alter-index-rebuild.htm#SPATL1017; 3 pages. [Retrieved Jun. 3, 2020].
(Continued)

*Primary Examiner* — Cindy Nguyen
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to performing database defragmentation operations by autonomously rebuilding index objects stored in one or more tablespaces of a database. In various embodiments, the disclosed techniques include autonomously performing defragmentation operations for one or more tablespaces in a database in an online manner such that a server system may continue to service data access requests while performing the defragmentation operations. In one non-limiting embodiment, for example, the disclosed techniques include selecting a first tablespace to defragment based on its level of fragmentation (e.g., relative to the other tablespaces). The server system may then rebuild index objects, from the first tablespace, to a new tablespace such that the index objects are stored in the new tablespace without fragmentation. The server system may then reclaim at least a portion of the storage space used to store the first tablespace and repeat, as desired, to autonomously defragment multiple tablespaces.

20 Claims, 11 Drawing Sheets

(51) Int. Cl.
*G06F 16/25* (2019.01)
*G06F 11/07* (2006.01)
*G06F 11/10* (2006.01)
*G06F 11/34* (2006.01)
*G06F 16/23* (2019.01)

(52) U.S. Cl.
CPC ...... *G06F 11/3409* (2013.01); *G06F 16/2282* (2019.01); *G06F 16/2343* (2019.01); *G06F 16/25* (2019.01); *G06F 2201/80* (2013.01)

(58) Field of Classification Search
CPC ............. G06F 11/1092; G06F 11/3409; G06F 16/2343; G06F 16/25; G06F 2201/80; G06F 16/217
See application file for complete search history.

(56) References Cited

U.S. PATENT DOCUMENTS

| | | | | |
|---|---|---|---|---|
| 2012/0284474 | A1* | 11/2012 | Lehr | G06F 3/0611 711/165 |
| 2012/0290588 | A1* | 11/2012 | Egan | G06F 16/2282 707/752 |
| 2015/0100606 | A1* | 4/2015 | Bonner | G06F 16/1727 707/803 |
| 2015/0186401 | A1* | 7/2015 | Baldwin | G06F 16/1724 707/693 |
| 2018/0196610 | A1* | 7/2018 | Harp | G06F 3/0604 |
| 2019/0188114 | A1* | 6/2019 | Hopper | G06F 11/1464 |
| 2020/0285389 | A1* | 9/2020 | Suarez | G06F 3/064 |
| 2020/0341955 | A1* | 10/2020 | Sukumaran | G06F 16/1724 |

OTHER PUBLICATIONS

Defragmentation, Wikipedia; https://en.wikipedia.org/w/index.php?title=Defragmentation&oldid=954507645; last edited on May 2, 2020, 8 pages.

Fragmentation (computing), Wikipedia; https://en.wikipedia.org/w/index.php?title=Fragmentation_(computing)&oldid=951685954; last edited on Apr. 18, 2020, 4 pages.

Database Administrator's Guide, Reclaiming Wasted Space, Oracle; https://docs.oracle.com/cd/B28359_01/server.111/b28310/schema003.html; 15 pages. [Retrieved May 8, 2020].

Database Administrator's Guide, 26 Managing Automated Database Maintenance Tasks, Oracle; https://docs.oracle.com/cd/E11882_01/server.112/e25494/tasks.htm#ADMIN0235; 7 pages. [Retrieved Jun. 20, 2020].

Database Administrator's Guide, Redefining Tables Online; https://docs.oracle.com/cd/B28359_01/server.111/b28310/tables007.html; 12 pages. [Retrieved May 26, 2020].

* cited by examiner

300
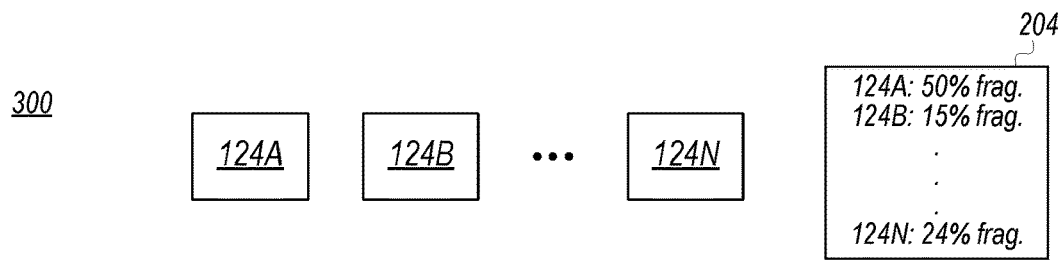
Select Table to Defragment
310
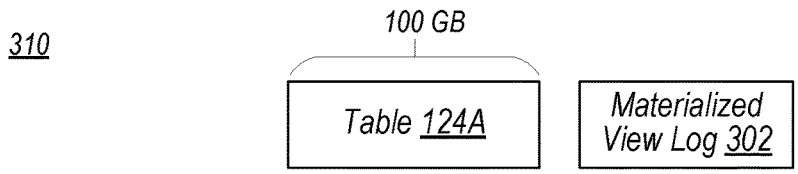
Create Materialized View Log
320
Create an Interim Table
330
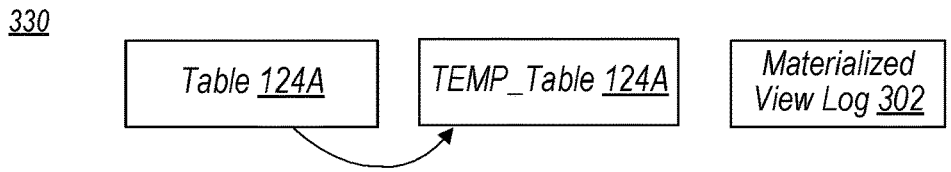
Copy Data from Selected Table to Interim Table
340
Synchronize Selected and Interim Table Using Materialized View Log 302
350
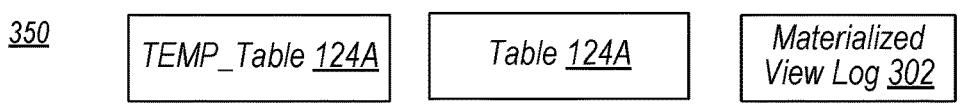
Exchange Internal Table Names
360
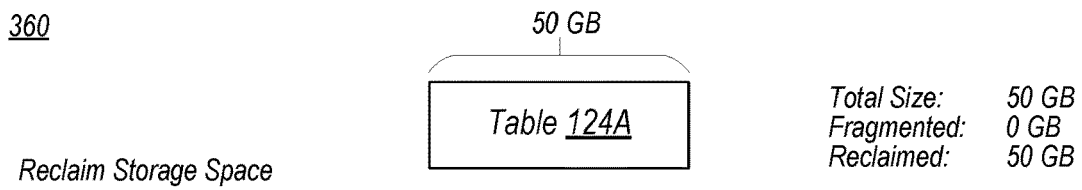
Reclaim Storage Space
Total Size: 50 GB
Fragmented: 0 GB
Reclaimed: 50 GB
FIG. 3

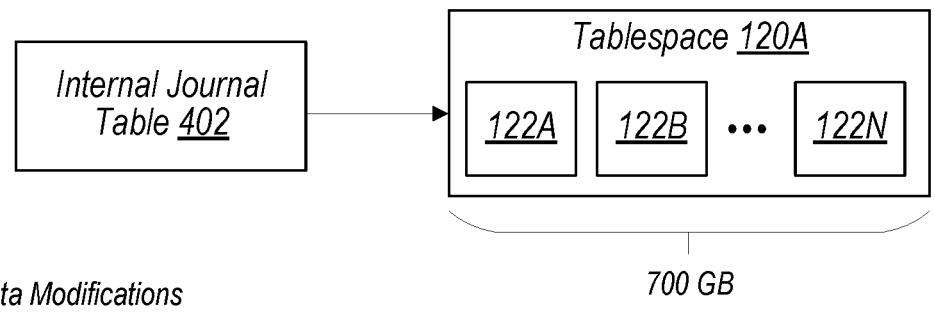
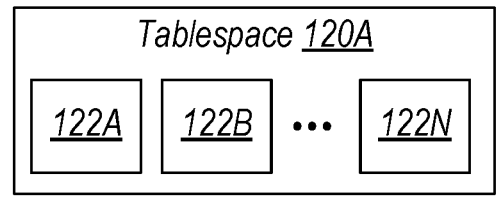
FIG. 4B

500

502 — Access fragmentation information corresponding to a plurality of tables in a database, where, for a given one of the plurality of tables, the fragmentation information indicates an amount of fragmentation of the given table

504 — Perform one or more preliminary checks

506 — Autonomously perform defragmentation operations on one or more tables, including by:

508 — Based on the fragmentation information, select a table to defragment

510 — Create a materialized view log based on the selected table

512 — Copy data from the selected table to an interim table such that the interim table is stored in the database without the fragmentation of the selected table

514 — While performing the defragmentation operations on the selected table, servicing one or more requests to perform a data modification operation on the selected table

516 — Based on the materialized view log, synchronizing the data stored in the selected table and the interim table

518 — Exchange internal names for the selected table and the interim table

520 — Subsequent to copying the data from the selected table to the interim table, reclaim storage space used to store at least a portion of the selected table

522 — Remaining tables to defragment? Yes → (loop back) / No → End

FIG. 5

AUTONOMOUS DATABASE DEFRAGMENTATION

BACKGROUND

Technical Field

This disclosure relates generally to database systems, and more particularly to autonomously performing defragmentation on one or more databases included within a server system.

Description of the Related Art

In the context of a database system, the term "fragmentation" refers to the condition in which the contents of a data file are stored in non-contiguous locations in physical storage (e.g., on a database server) rather than in contiguous storage sections. Fragmentation, which often occurs during the course of normal operation of a database system, may cause various technical problems. For example, database fragmentation results in the inefficient use of storage space and diminished performance of the database (e.g., decreased data retrieval time). Additionally, fragmentation reduces the available storage capacity, which results in the added expense of purchasing additional storage.

BRIEF DESCRIPTION OF THE DRAWINGS

FIG. 3 depicts a series of block diagrams illustrating select stages in the process of a table redefinition module autonomously performing defragmentation operations, according to some embodiments.

FIGS. 4A-4B depict a series of block diagrams illustrating select stages in the process of an index rebuilder module autonomously performing defragmentation operations, according to some embodiments.

FIG. 5 depicts a flow diagram illustrating an example method for performing database defragmentation operations by autonomously redefining tables stored in the database, according to some embodiments.

DETAILED DESCRIPTION

Figure 1:
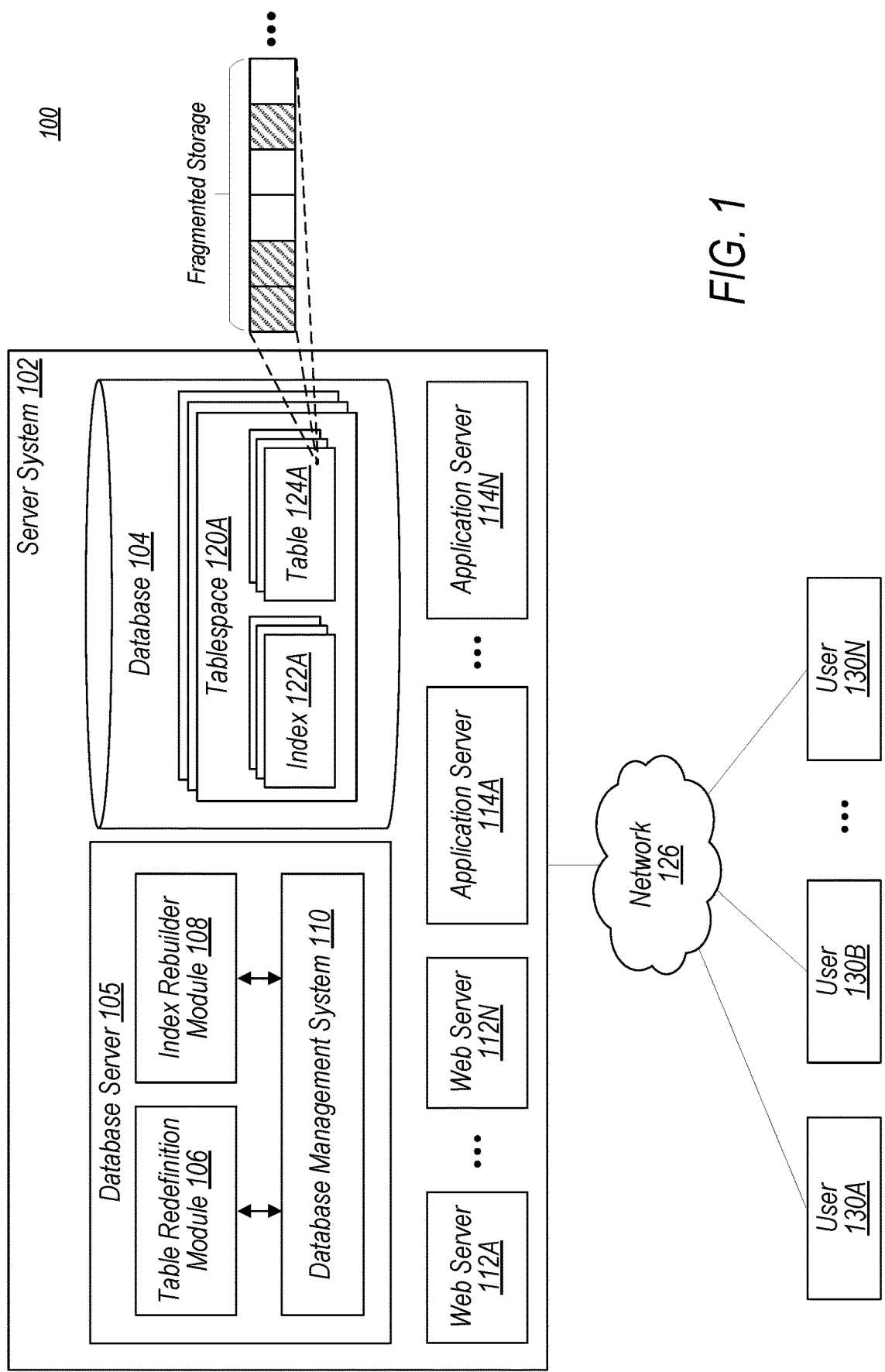
FIG. 1 depicts a block diagram depicted an example server system, according to some embodiments.

In large-scale server systems that provide computing resources to remote users (e.g., as part of one or more web services), databases are frequently accessed and the data stored therein frequently modified. When database objects (e.g., tables, indexes, etc.) are initially created, they are typically mapped to contiguous storage sections. During the course of normal operation, however, the deletion of portions of data gives rise to "fragmentation" in the database in which the contents (e.g., tablespaces, tables, indexes, etc.) of a data file are stored in non-contiguous locations in physical storage rather than in contiguous storage sections. Fragmentation causes various technical problems. For example, database fragmentation results in the inefficient use of storage space and diminished performance of the database (e.g., decreased data retrieval time). Additionally, fragmentation reduces the available storage capacity, which results in the added expense of purchasing and maintaining additional storage.

Fragmentation may be addressed through the process of "defragmentation," in which the contents of a database are reorganized such that the various database objects contained therein are stored in contiguous storage sections. Prior techniques for performing database defragmentation present various technical problems, however, particularly in the context of a server system that provides large-scale, highly available web services to many remote users. For example, many prior defragmentation techniques, such as exporting and re-importing a database table, require downtime during which the database (or the database objects being defragmented) are unavailable. These solutions are not suitable for the large-scale server systems in which the databases need to be highly available. Further, prior defragmentation techniques that are capable of operating in an "online" manner are also not suitable for the large-scale server system environments. For example, some online table redefinition tools (such as the Online Table Redefinition tool provided for Oracle™ databases) allow for structural modifications to a table to be made without significantly affecting the availability of the table. Such tools also present various technical shortcomings, however, as they are manual in nature and require a significant amount of user (e.g., a database administrator or "DBA") time and manual intervention to identify the database objects on which to perform the defragmentation, lock the database object so as to avoid object-level and maintenance job-level collisions, monitor the progress of the re-organization job, etc. To utilize such tools in a large-scale server system environment, for example, would require the continuous manual efforts of many DBAs (e.g., 20, 50, 100, etc.). Further, even if such manual efforts could be made, such prior tools still present numerous technical shortcomings. For instance, such tools are not equipped to perform defragmentation on database objects at a mass scale, as is needed in a large-scale server system in which there are many databases, each of which may contain many tablespaces, any one of which may, in turn, include hundreds or thousands of database objects. Accordingly, it would be both technically infeasible and logistically undesirable to use such prior defragmentation tools in a large-scale server system.

In various embodiments, however, the disclosed techniques may solve these and other technical problems by performing online database defragmentation in an autonomous manner, reclaiming storage space and improving the performance of the database system as a whole. For example, in various embodiments, the disclosed techniques may be used to defragment at least a portion of a database by autonomously rebuilding index objects included in one or more tablespaces in the database. In some such embodiments, a fragmentation analyzer is operable to determine an amount of fragmentation of the various tablespaces included in a database and write this fragmentation information to a log file. As one non-limiting example, the fragmentation information may specify, for a given tablespace, the total size of the tablespace, the size of the portion of the tablespace that is actually "in use" to store data, a size of the fragmented portion of the tablespace, etc. Based on this fragmentation information, an index rebuilder module may select a tablespace (e.g., tablespace "T1") that has the highest amount of fragmentation (measured, for example, as a percentage of the total tablespace size) to defragment. In many instances, the tablespace will include multiple (and, potentially, many) index objects. In this disclosure, the term "tablespace" is used according to its understood meaning in the art, which includes a logical structure used to store database objects, such as tables, index objects, or any other suitable database object.

An index rebuilder module may then create a new tablespace that is at least the size of the in-use portion of the selected tablespace. For example, in some embodiments, the size of the new tablespace may be determined by subtracting the size of the fragmented portion of the tablespace from the size of the in-use portion of the tablespace. Once the new tablespace (e.g., "NEW_T1") is created, the index rebuilder module may then modify the internal names for the selected tablespace and the new tablespace to ensure that the logical storage definition (the tablespace name "T1," in the running example) does not change for the indexes that are currently in the selected tablespace. For example, the index rebuilder module may rename the selected tablespace "TEMP_T1" and rename the newly created tablespace "T1." Once the selected tablespace is renamed to "TEMP_T1," in some such embodiments, the logical tablespace storage name for the indexes in the selected tablespace will also be changed to "TEMP_T1."

In various embodiments, once this name exchange is performed, the index rebuilder module then rebuilds the index objects from the selected tablespace into the newly created tablespace. Once an index, of the various index objects in the selected tablespace, is rebuilt in the newly created tablespace, the logical storage name for that index will be set back to the original name of the selected tablespace (e.g., to "T1" from "TEMP_T1"). In some embodiments, once all of the index objects are moved from the selected tablespace to the newly created tablespace, the selected tablespace will be empty and the storage space allocated for the selected tablespace may then be reclaimed (e.g., for use by the newly created tablespace or by the storage management system of the database). Various embodiments of the disclosed techniques for autonomously rebuilding index objects are described in detail below.

Further, in various embodiments, the disclosed techniques may be used to defragment at least a portion of a database by autonomously redefining tables stored in the database. In some such embodiments, a table redefinition module may access fragmentation information corresponding to a plurality of tables stored in the database. Using this fragmentation information, the table redefinition module, in various embodiments, selects a table having a highest amount of fragmentation (measured, for example, as a percentage of the total table size) to defragment. Once it has selected a table, the table redefinition module may then create a new interim table and copy the data from the selected table to the interim table. Note that, in some embodiments, the interim table may be created in the same tablespace as the selected table. In other embodiments, however, the disclosed techniques may be used to migrate one or more tables from one tablespace to another (e.g., one using a new tablespace architecture) and, in such embodiments, the table redefinition module may create the interim table in this other tablespace.

During this process of copying data from the selected table to the interim table, in various embodiments, the server system is still able to service data modification requests on the selected table. For example, after the table redefinition module selects a table, it may create a materialized view log on that table that captures the data modifications being made to the selected table while its data is being copied to the interim table. In some embodiments, after the data is copied from the selected table to the interim table, the table redefinition module may then synchronize the two tables based on the materialized view log so that the interim table also includes the data modifications that occurred on the selected table during the copying process. After this synchronization is finished, in some embodiments, the table redefinition module exchanges the table names and the original table is released, allowing that storage space to be reclaimed. In various embodiments, this process may be repeated for various tables in the database, such as those tables for which the percentage of fragmentation exceeds some predetermined threshold value (e.g., 20%, 35%, 50%, etc.). Various embodiments of the disclosed techniques for autonomously redefining tables are described in detail below.

In FIG. 1, block diagram 100 depicts a server system 102 that includes a database 104, database server 105, web servers 112, and application servers 114. In the depicted embodiment, database server 105 includes database management system 110, table redefinition module 106, and index rebuilder module 108. In various embodiments, table redefinition module 106 and index rebuilder module 108 are operable to defragment at least a portion of the database 104 by autonomously redefining tables stored in the database 104 and autonomously rebuilding index objects stored in the database 104, respectively.

For example, in various embodiments, server system 102 may use web servers 112A-112N and application servers 114A-114N to host various web services for remote users 130 via network 126, using database server 105 to maintain and access associated data in one or more databases 104. As one non-limiting example, server system 102 may, in some embodiments, provide customer relationship management ("CRM") services for users 130. Note, however, that this embodiment is provided merely as an example and, in other embodiments, server system 102 may provide any suitable web service(s). As part of providing these web services, database server 105 may store data (and, typically, large amounts of data) in database 104 using various logical data structures. In the depicted embodiment, database 104 includes tablespaces 120A-120N, any of which may store one or more indexes 122A-122N or tables 124A-124N. (Note, however, that this embodiment is provided merely as a non-limiting example. In various embodiments, database 104 may store any of various suitable types of database objects.) In various embodiments, database management system 110 may be implemented using any of various suitable technologies, such as Oracle™ RDBMS, IBM™ DB2, MySQL™, or any other suitable database management system. In operation, database management system 110 will store, access, modify, and delete various items of data on behalf of the users 130A-130N. As discussed above, deleting portions of a database object often causes fragmentation in database 104 to occur. Consider, as one non-limiting example, table 124A stored in tablespace 120A. When the table 124A is initially stored in database 104, it is mapped to and stored in contiguous storage sections. As portions of table 124A (e.g., rows) are deleted, however, the underlying data for table 124A is no longer stored in contiguous storage sections. Instead, the storage sections actually used to store the data for table 124A (that is, the storage sections that are "in use") are interspersed with unused storage sections, as shown in the simplified depiction of FIG. 1.

In various embodiments, however, the table redefinition module 106 is operable to autonomously perform defragmentation operations on (potentially numerous) tables stored in the database 104. For example, in various embodiments, table redefinition module 106 accesses fragmentation information that indicates an amount of fragmentation in one or more tables 124 (e.g., all or any suitable subset of the tables 124) stored in the database 104. The process of analyzing the database objects stored in the database 104 and generating the fragmentation information is described in more detail below with reference to FIGS. 3 and 5. Based on this fragmentation information, table redefinition module 106 may select a first table 124 (e.g., table 124A) to defragment. In one non-limiting embodiment, for example, table redefinition module 106 may defragment the tables 124 in order from highest to lowest percentage of fragmentation.

Once selected, table redefinition module 106, in various embodiments, may then create an interim table and copy the data stored in the selected table (e.g., table 124A) into this interim table such that the interim table includes all of the data of the selected table but, when stored in the database 104, does not include the fragmentation of the selected table. Stated differently, when the table redefinition module 106 copies the data from the selected table to the interim table, the interim table is stored with all of the data but without the fragmentation of the selected table. As a non-limiting example, if table 124A is 100 GB and 50% fragmented, after the table redefinition module 106 has finished copying the data from the table 124A to the interim table, the interim table will be 50 GB in size and contain all of the data from table 124A. In various embodiments, the disclosed systems and methods are operable to continue servicing requests (e.g., initiated by users 130) to access or modify data stored in the selected table while it is being defragmented. For example, in some embodiments, table redefinition module 106 may create a materialized view log for the selected table 124A, where the materialized view log records an entry for any data manipulation operations (specified, for example, in a data manipulation language ("DML")) performed on the selected table 124A while the data in the table 124A is being copied to the interim table. After all of the data have been copied from the selected table 124 to the interim table, the table redefinition module 106, in various embodiments, may use the materialized view log to synchronize the any changes made to the selected table during the copying process.

Once this synchronization is complete such that all of the data from the selected table 124 is stored in the interim table, in various embodiments, table redefinition module 106 may exchange the internal names of the two tables so that the interim table (the new, more efficient version of the selected table 124A) may be used as the "live" copy and the selected table 124A (the original, less efficient version of table 124A) may be dropped, allowing the storage space used to store the original version of table 124A to be reclaimed to the tablespace in which the table 124A was stored and that space used to store other database objects. In various embodiments, once the table redefinition module 106 is finished defragmenting the table 124A, it may repeat this process to defragment one or more other tables stored in database 104. For example, in one non-limiting embodiment, table redefinition module 106 may iteratively perform these autonomous defragmentation operations on all tables 124 within one or more tablespaces 122 that are fragmented above a particular threshold value (e.g., 25% fragmented). Further, as noted above, table redefinition module 106, in various embodiment, is operable to prioritize the order in which it defragments the tables 124 in the database 104. For example, in some embodiments, table redefinition module 106 selects the tables 124 in order from highly fragmented to least fragmented (e.g., in terms of percent of fragmentation, storage space to be reclaimed through defragmentation, etc.) so that the table redefinition module 106 is able to reclaim storage space as quickly and efficiently as possible.

Note that, in various embodiments, as table redefinition module 106 performs the defragmentation operations on the selected table 124A, various embodiments of the disclosed systems and methods monitor one or more aspects of the database 104 to ensure that the defragmentation operations are performed successfully and to determine whether these operations should be interrupted for any reason. The process of monitoring the database 104 during the defragmentation operations are described in more detail below with reference to FIGS. 2 and 9.

Further, in various embodiments, index rebuilder module 108 is operable to autonomously perform defragmentation operations for one or more of the tablespaces 120 in the database 104. For example, in some embodiments, index rebuilder module 108 has access to fragmentation information that indicates an amount of fragmentation in one or more of the tablespaces 120. In one non-limiting embodiment, for example, the fragmentation information indicates, for a given tablespace 120, a size of the tablespace, an amount of the tablespace that is in use, an amount of the tablespace that is available, an amount of the tablespace that is fragmented, etc. Based on this fragmentation information, the index rebuilder module 108 may select a first tablespace (e.g., tablespace 120B, not separately shown in FIG. 1) to defragment. In some embodiments, index rebuilder module 108 may select the tablespaces 120 to defragment in a prioritized order from most fragmented to least fragmented so that the index rebuilder module 108 is able to reclaim storage space as quickly and efficiently as possible.

In various embodiments, the index rebuilder module 108 may then create a new tablespace that is at least the size of the in-use portion of the selected tablespace 120B. For example, in some embodiments, the size of the new tablespace may be determined by subtracting the size of the fragmented portion of the selected tablespace 120B from the size of the used portion of the selected tablespace 120B. Once the new tablespace (e.g., "NEW_120B") is created, the index rebuilder module 108 may then modify the internal names for the selected tablespace and the new tablespace to ensure that the logical storage definition (the tablespace name "120B," in the running example) does not change for the indexes that are currently in the selected tablespace. For example, the index rebuilder module 108 may rename the selected tablespace "TEMP_120B" and rename the newly created tablespace "120B." Once the selected tablespace is renamed to "TEMP_120B," in some such embodiments, the logical tablespace storage name for the indexes in the selected tablespace will also be changed to "TEMP_120B."

In various embodiments, once this name exchange is performed, the index rebuilder module 108 then rebuilds the index objects 122 from the selected tablespace into the newly created tablespace. Once an index, of the various index objects in the selected tablespace, is rebuilt in the newly created tablespace, the logical storage name for that index will be set back to the original name of the selected tablespace (e.g., to "120B" from "TEMP_120B"), according to some embodiments. Further, in some embodiments, once all of the index objects are moved from the selected tablespace to the newly created tablespace, the selected tablespace will be empty and the storage space allocated for the selected tablespace may then be reclaimed (e.g., for use by the newly created tablespace or by the storage management system of the database 104).

Note that, in some embodiments, the various elements of server system 102 may be located at the same physical location (e.g., within a single datacenter) or may be located at physical locations that are remote from one another (e.g., distributed across multiple datacenters in different physical locations or geographic regions). Additionally, note that, in some embodiments, the term "server system" (such as database server 105, application server 114, web server 112, or server system 102) may refer to a single machine. In other embodiments, however, the term "server system" may refer to multiple machines executing (e.g., at one or more datacenters) for the benefit of a single entity. For example, in some embodiments, one or more of database server 105, application server 114, web server 112, or server system 102 may be implemented using multiple machines located at one or more datacenters. Further note that, although a single database server 105 and database 104 are shown in FIG. 1 for clarity, this simplified embodiment is provided merely as one non-limiting example. In other embodiments, server system 102 may include any suitable number of database servers 105 and databases 104. For example, in various embodiments in which server system 102 is a large-scale system used to provide computing resources to many users across multiple geographic regions, server system 102 may include multiple database servers 105 (also referred to as "nodes") hosting one or more instances of database management system 110, table redefinition module 106, index rebuilder module 108, or any suitable combination thereof.

The disclosed techniques provide various technical benefits, according to various embodiments. For example, in various embodiments, the disclosed systems and methods are capable of autonomously performing database defragmentation operations in a manner that efficiently and intelligently reclaims storage space that would otherwise be wasted, resulting in substantial storage and financial savings for the entity that provides the server system 102. As one non-limiting example, consider the autonomous defragmentation operations described above with reference to the index rebuilder module 106. Depending on the size of a tablespace being defragmented and the extent of its fragmentation, performing autonomous index rebuilding operations on even a single tablespace can reclaim a significant amount of storage space (e.g., hundreds of gigabytes). When this technique is used on a regular basis over an extended period of time to defragment many (e.g., hundreds or thousands) of tablespaces, the disclosed techniques may routinely reclaim large amounts (e.g., terabytes or more) of storage space that may then be used to store additional data for the server system, improving the performance of the database system and resulting in significant financial savings (e.g., hundreds of thousands or millions of dollars in physical storage devices and associated service costs).

Additionally, in various embodiments, the disclosed techniques operate in an "online" manner such that the database objects being defragmented remain highly available during the defragmentation process, as explained in greater detail below. That is, while some prior database defragmentation techniques require periods of "downtime" during which portions of a database, or entire databases, are unavailable, the disclosed systems and methods are capable of performing the disclosed autonomous defragmentation operations while continuing to keep the database objects being defragmented available for use by the end users 130 and the software applications hosted by the server system 102. For example, in various embodiments, the disclosed techniques operate in a manner that is transparent to the applications hosted by server system 102 (e.g., on application servers 114) that rely on the database server 105 and the database 104 for data utilized by these applications. In various embodiments, the online nature of the disclosed techniques does not interfere with the operation or availability of these applications. The online nature of the disclosed techniques may be particularly beneficial in the context of a server system 102 that provides highly available web services to a large user base (consisting, for example, of hundreds of thousands or millions of users) across many different geographic regions.

Further, in various embodiments, the disclosed techniques autonomous database defragmentation techniques are highly scalable such that they can be implemented in a small server system 102 (e.g., with only one database 104 or one database server 105) or in a large-scale production server system 102 that scales multiple datacenters with many (e.g., hundreds or thousands) of database servers 105 and databases 104. In the latter scenario, performing manual defragmentation operations to optimally defragment thousands of databases simply is not technically, logistically, or financially feasible. Accordingly, in various embodiments, the disclosed techniques improve the functioning of the server system 102 by providing a level of scalability not possible using prior techniques. For at least these reasons, the disclosed embodiments overcome various technical problems presented by the prior art, thereby improving the defragmentation process and the operation of the server system 102 as a whole.

Figure 2:
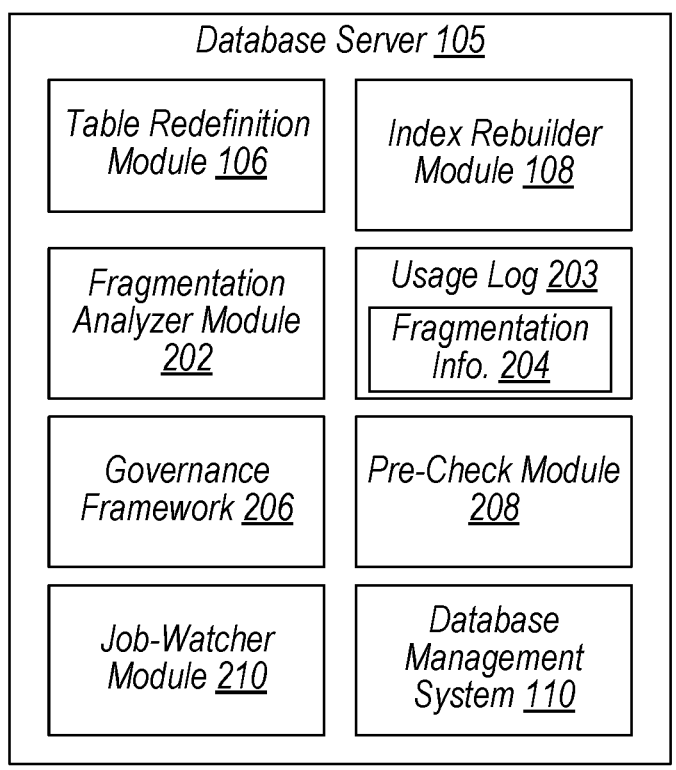
FIG. 2 depicts a block diagram illustrating an example database server, according to some embodiments.

In FIG. 2, block diagram 200 depicts a more detailed view of database server 105, according to some embodiments. Note that, although a single database server 105 (also referred to herein as a "node") is shown in FIGS. 1 and 2 for clarity, server system 102 may include any suitable number of database servers 105 located at one or more physical locations (e.g., datacenters), as desired. In the depicted embodiment, database server 105 includes table redefinition module 106, index rebuilder module 108, and database management system 110 (as shown in FIG. 1) in addition to fragmentation analyzer module 202, fragmentation information 204, governance framework 206, pre-check module 208, and job watcher module 210. (Note that, although shown executing on the same database server 105 in the depicted embodiment for convenience, the modules depicted in FIG. 2 may be implemented across any suitable number of database servers 105, according to different embodiments.)

As described in more detail below, the modules of database server 105 depicted in FIG. 2, in various embodiments, are operable to autonomously perform the database defragmentation operations described herein. For example, in some embodiments, table redefinition module 106 and index rebuilder module 108 may operate independently of one another to perform the various defragmentation operations described below while still utilizing the other modules depicted in FIG. 2 to perform their respective defragmentation operations. Stated differently, in some embodiments, table redefinition module 106 may operate in cooperation with one or more of the other modules depicted in FIG. 2 (e.g., one or more of fragmentation analyzer module 202, governance framework 206, pre-check module 208, job watcher module 210, or database management system 110) to autonomously perform defragmentation operations on one or more tables stored in the database 104. Similarly, in some embodiments, index rebuilder module 108 may operate in cooperation with one or more of the other modules depicted in FIG. 2 (e.g., one or more of fragmentation analyzer module 202, governance framework 206, pre-check module 208, job watcher module 210, or database management system 110) to autonomously defragment at least a portion of a database 104 by autonomously rebuilding index objects included in one or more tablespaces in the database 104. The operation of table redefinition module 106, according to some embodiments, is described in more detail below with reference to FIGS. 3 and 5. Similarly, the operation of index rebuilder module 108, according to some embodiments, is described in more detail below with reference to FIGS. 4 and 6. In the remaining discussion of FIG. 2, the operation of fragmentation analyzer module 202, governance framework 206, pre-check module 208, and job watcher module 210, according to some embodiments, is described.

Fragmentation analyzer 202, in various embodiments, is operable to analyze database objects in database 104 to determine various items of usage information about the database objects (including information identifying the amount of fragmentation of the database objects) and write that information to a log file, such as usage log 203, and a table (not separately shown). For example, in some embodiments, fragmentation analyzer 202 is operable to find the fragmentation percentage of each (or any suitable subset) of the database objects in database 104, such as tables 124, indexes 122, tablespaces 120, etc., and write that fragmentation information 204 to usage log 203. (Note that, although shown on database server 105 in FIG. 2, usage log 203 may be stored on any suitable storage device located in (or accessible to) server system 102, such as database 104.) In embodiments in which database 104 is an Oracle™ database, for example, fragmentation analyzer 202 may determine at least a portion of the fragmentation information 204 using the Oracle™ DBMS_SPACE package. Note, however, that this embodiment is provided merely as one non-limiting example and, in other embodiments, fragmentation analyzer 202 may use any of various suitable techniques to determine the fragmentation information 204.

As described in more detail below with reference to FIGS. 3-6, table redefinition module 106 and index rebuilder module 108 may use the fragmentation information 204 to select which database objects to defragment and the order in which to perform the defragmentation. For example, in some embodiments, table redefinition module 106 is operable to autonomously defragment tables 124 in order from highest to lowest percentage of fragmentation, from highest to lowest amount of fragmented storage space (specified, for example, in gigabytes), or using any other suitable selection technique. Similarly, in various embodiments, index rebuilder module 108 is operable to autonomously defragment indexes 122 by selecting the tablespaces 120 in order from highest to lowest amount of fragmentation or, having selected a tablespace 120 to defragment, rebuild the indexes 122 in order from those having the highest to lowest amount of fragmentation, or using any other suitable selection technique.

In various embodiments, fragmentation analyzer 202 is operates according to a specified schedule. As non-limiting examples, fragmentation analyzer 202 may be configured to run every day, every weekday, every 2 days, on specified days of the week or month, or according to any other specified schedule, as desired. Additionally, on the days on which the fragmentation analyzer 202 is scheduled to operate, it may operate within a specified window of time (e.g., between 12 am and 4 am EST). Further, in some embodiments, fragmentation analyzer 202 may be configured to analyze all database objects in a database 104 or only those database objects that satisfy certain criteria, such as size criteria (e.g., database objects greater than 2 GB), age criteria (e.g., older than one month), time since last defragmentation (e.g., longer than six months since last defragmentation), or any of various other suitable criteria. In one non-limiting embodiment, for example, fragmentation analyzer 202 is configured to run daily, analyzing all database objects (regardless of size) on weekends and analyzing only those database objects that are larger than 1 GB on weekdays. The operation of fragmentation analyzer 202, according to various embodiments, is described in more detail below with reference to FIG. 7.

Governance framework 206, in various embodiments, is operable to coordinate the performance of various jobs that are being performed on the database server 105 (and using database 104) to avoid object-level collisions and optimize overall throughput. For example, in some embodiments, governance framework 206 is operable to organize and coordinate switching between different processing jobs (such as defragmentation jobs performed by table redefinition module 106 and index rebuilder module 108, patches, releases, backups, etc.) so that users (e.g., DBAs) do not have to manually monitor and coordinate the execution of such jobs, saving user time and resources.

In various embodiments, governance framework 206 is a package that includes one or more tables and provides one or more APIs that may be called by the various jobs running on database server 105. Non-limiting examples include APIs to provide one or more of the following functions: placing a suspension window for processing jobs, removing a suspension window for processing jobs, enabling or disabling processing jobs, creating a dependency between jobs such that, when a particular job is called, it will place an automatic suspension for the dependent job(s), creating an exclusive logical lock on a database object prior to processing it, removing the exclusive logical lock on the database object after the object has been processed, checking for processing job suspensions, or any of various other suitable functions. In some embodiments, various processing jobs (including the autonomous defragmentation operations performed by table redefinition module 106 and index rebuilder module 108) executing on database server 105 may use one or more of these APIs to coordinate their operations on database 104 via the governance framework 206.

In various embodiments, the governance framework 206 provides an easy way for processing jobs to create "suspension windows" (or multiple suspension windows, as desired) during which one or more specified processing jobs (e.g., all jobs other than jobs related to performing database defragmentation) will be suspended until the suspension window ends. In various embodiments, for example, a processing job operating on the database server 105 will automatically suspend itself when it determines that is within a suspension window and will automatically resume operation once the suspension window is completed. For example, when a particular object has been selected by the table redefinition module 106 or the index rebuilder module 108, the governance framework 206, according to some embodiments, is operable ensures that the particular object will not also be selected by any other maintenance tools, helping to avoid object-level collisions. In various embodiments, the table redefinition module 106 and the index rebuilder module 108 are operable to call one or more of the APIs provided by the governance framework 206 to create an exclusive logical lock on a database object before processing it and also to remove the lock once the processing is complete. In various embodiments, if there is an accidental collision, the governance framework 206 is operable to handle the collision and log information corresponding to the collision. Note that, using the governance framework 206, suspension windows may be created prior to the beginning of the time at which the suspension window is to begin.

Further, in various embodiments, the governance framework 206 allows dependencies between processing jobs to be established such that a "parent" job will automatically take precedence over (and, therefore, be performed before) one or more "child" processing jobs. For example, when there is another job that is of a higher precedence that needs to run, the governance framework suspends the lower precedence job to avoid maintenance job collisions.

Pre-check module 208, in various embodiments, is operable to evaluate or "check" various conditions relating to the status of the database 104 or the database server 105 prior to (or at various points during) the defragmentation operations performed by the table redefinition module 106 and the index rebuilder module 108. In various embodiments, the table redefinition module 106 and index rebuilder module 108 may determine whether to proceed or delay performing defragmentation operations based on an outcome of the preliminary checks performed by pre-check module 208. For example, in some embodiments, the table redefinition module 106 or the index rebuilder module 108 may proceed with their respective defragmentation jobs only if all of a specified set of preliminary checks are successfully passed and, if not, the defragmentation jobs may be postponed until a later time, at which point the pre-check module 208 may perform the preliminary checks again to determine whether the relevant conditions have changed. Further note that, in various embodiments, pre-check module 208 may evaluate different the same set of conditions or a different set of conditions when performing preliminary checks for table redefinition module 106 and index rebuilder module 108.

In various embodiments, pre-check module 208 is operable to perform one or more of the following preliminary checks: verifying that it is currently a period of decreased demand (e.g., for the database 104, for one or more web services hosted by the server system 102, for the database server 105, etc.), whether there is sufficient storage space available to perform the relevant processing job (e.g., defragmentation operations), whether there are currently any active suspension windows for the relevant processing job, checking the data guard lag (that is, verifying whether the recovery time object (RTO) of the Active Data Guard environment (DR database) is within a particular threshold), checking the current average page time (APT) data (which indicates the average response time (e.g., in milliseconds) to the requesting application), or any of various other preliminary checks, as desired. For example, in one non-limiting embodiment, prior to the table redefinition module 106 or index rebuilder module 108 autonomously performing defragmentation operations, the pre-check module 208 may perform one or more of the following types of preliminary checks: determining whether there is sufficient storage space available to perform the defragmentation operations, verifying that the defragmentation operations are being performed during a period of decreased demand, and determining whether any suspension windows are currently active. In some such embodiments, in response to a determination that one or more of these preliminary checks are unsuccessful, the table redefinition module 106 or index rebuilder module 108 may abort their respective defragmentation operations.

Further, note that, in some embodiments, the pre-check module 208 may be configured to dynamically perform the preliminary checks, as desired. For example, in some embodiments, pre-check module 208 may be configured to perform a different set of preliminary checks for different processing jobs, perform different preliminary checks at different times, etc. (Note that, in some embodiments, the pre-check module 208 may also perform various preliminary checks prior to the initiation of (or during the course of) various other processing jobs performed on the database 104 or database server 105, as desired.) The operation of pre-check module 208, according to various embodiments, is described in more detail below with reference to FIG. 8.

Job watcher module 210, in various embodiments, is operable to monitor various aspects of the database 104 or database server 105 to ensure that the defragmentation operations are being performed successfully and to determine whether these operations should be interrupted, eliminating the need for manual effort (e.g., by a DBA) to monitor the database 104 while the autonomous defragmentation operations are being performed. For example, in some embodiments, the job watcher module 210 is operable to continuously monitor the database 104 or database server 105 (e.g., every 15 seconds, 30 seconds, 60 seconds, or at any other suitable interval) for various specified metrics and take corrective actions as necessary. Job watcher module 210, in various embodiments, is operable to monitor one or more of the following metrics: application timeout statistics, the number of active sessions, whether autonomous jobs (e.g., autonomous defragmentation jobs) are blocking any other users' connections, whether is an "off-peak" time period (e.g., a period of decreased demand), or any other suitable metric relating to database 104, database server 105, or the various processing jobs executing thereon. In one non-limiting embodiment, for example, the job watcher 210 may monitor a number of active sessions that are executing on the database server 105 and, in response to the number of active user sessions exceeding a particular threshold value, terminate one or more of the defragmentation jobs. In another non-limiting embodiment, for example, the job watcher module 210 may monitor a number of user connections being blocked by the autonomous defragmentation operations and, in response to the number of user connections being blocked exceeding a particular threshold value, terminating the defragmentation operations. The operation of job watcher module 210, according to various embodiments, is described in more detail below with reference to FIG. 9.

Note that, in various embodiments, the disclosed systems and methods may provide one or more visualization components that enable a user (e.g., a DBA) to monitor the status, progress, and results of defragmentation operations performed by index rebuilder module 108 or table redefinition module 106. For example, in some such embodiments, the disclosed techniques may provide a service that allows a user to access one or more visualization components (implemented, for example, using any suitable GUI and data visualization elements) that indicates the amount of storage space that has been reclaimed through the disclosed autonomous database defragmentation operations, for example over a selected period of time, on a selected node, at a selected datacenter, in a selected region, etc.

FIG. 3 includes a series of block diagrams 300-360 graphically depicting various stages in the process of table redefinition module 106 autonomously performing defragmentation operations on a table stored in database 104, according to some embodiments. Note that the diagrams shown in FIG. 3 are not intended to limit the scope of the present disclosure but, instead, are intended to aid in the understanding of some of the disclosed embodiments.

In block diagram 300, in the illustrated embodiment, table redefinition module 106 accesses fragmentation information 204 that indicates an amount of fragmentation of various tables 124A-124N stored in database 104. (Note that, in some embodiments, the tables 124A-124N may be stored within the same or different tablespaces 120 in database 104. Further, in some embodiments, database 104 may store one or more tables 124 for which there is not corresponding fragmentation information 204.) In the depicted embodiment, table redefinition module 106 selects table 124A based on the fragmentation information 204 indicating that table 124A has a highest percentage of fragmentation (e.g., 50%) of the tables 124A-124N.

In block diagram 310, in the illustrated embodiment, after selecting table 124A, table redefinition module 106 creates a materialized view log 302 on the selected table 124A. In various embodiments, materialized view log 302 is a table that includes duplicate data of that stored in the selected table 124A such that any data modification operations ("DMLs") performed on the table 124A will also have an entry in the materialized view log 302. In various embodiments, the use of materialized view log 302 facilitates performing the defragmentation operations (and, more specifically, the table reorganization) in an "online" manner (that is, while the selected table 124A is continually accessible) because the DMLs that are happening on the selected table 124A during the period of reorganization are reflected in the materialized view log 302. As discussed below, materialized view log 302 may be used to synchronize the changes made to the selected table 124A during the reorganization process.

In block diagram 320, in the illustrated embodiment, table redefinition module 106 creates a "skeleton" interim table ("TEMP_table 124A) to which the data in the selected table 124A may be copied. In some embodiments, the interim table may be in the same tablespace 120 (e.g., tablespace 120A) as the selected table. In other embodiments, such as those in which one or more of the tables 124A-124N are to be migrated to a new tablespace 120, the interim table may be created in a different tablespace 120 (e.g., tablespace 120B).

In block diagram 330, in the illustrated embodiment, table redefinition module 106 copies data from the selected tablespace 120A to the interim table. In some embodiment, for example, table redefinition module 106 will copy all of the data that existed in the selected table 124A, as it existed at the time the reorganization process began, to the interim table. In various embodiments, however, as this data is being copied into the interim table, it is stored in the database 104 without the fragmentation of the original selected table 124A.

In block diagram 340, in the illustrated embodiment, table redefinition module 106 uses the materialized view log 302 to synchronize the selected table (e.g., table 124A) and the interim table (e.g., TEMP_table 124A) to account for any data modification operations performed on the selected table 124A while data was being copied. For example, in some embodiments, during the synchronization process, table redefinition module 106 reads data changes from the materialized view log 302 and applies those changes to the interim table. After this synchronization is performed, in such embodiments, the selected table 124A and the interim table will contain the same data and are, effectively, copies of one another, with the copy in the interim table (e.g., TEMP_table 124A) being stored in a defragmented, more efficient manner than the original, fragmented copy in the selected table 124A.

In block diagram 350, in the illustrated embodiment, table redefinition module 106 performs an internal name exchange on the selected table 124A and the interim table, allowing the new, more-efficient copy of table 124A to be used as the live copy (e.g., for use in servicing requests from users 130) and the older, less-efficient copy of table 124A to be reclaimed, as shown in block diagram 360. In the depicted embodiment, for example, the original, fragmented version of table 124A was 100 GB in size with 50% fragmentation and the new, defragmented version of table 124A is 50 GB in size with 0% initial fragmentation, allowing 50 GB of storage space to be reclaimed by defragmenting a single table 124. As described elsewhere herein, table redefinition module 106, in various embodiments, may repeat this process to autonomously perform defragmentation on multiple (potentially numerous) tables 124 stored in database 104, optionally during a period of lower demand (that is, an "off-peak" time) for the server system 102. Note that, in various embodiments, the selected table 124A is locked exclusively for a very short period of time (e.g., 10 ms, 50 ms, 100 ms, etc.) while the name exchange is being performed. Further, note that, in some embodiments, the materialized view log 302 may be dropped by the table redefinition module 106 after the table exchange is performed.

Figure 4A:
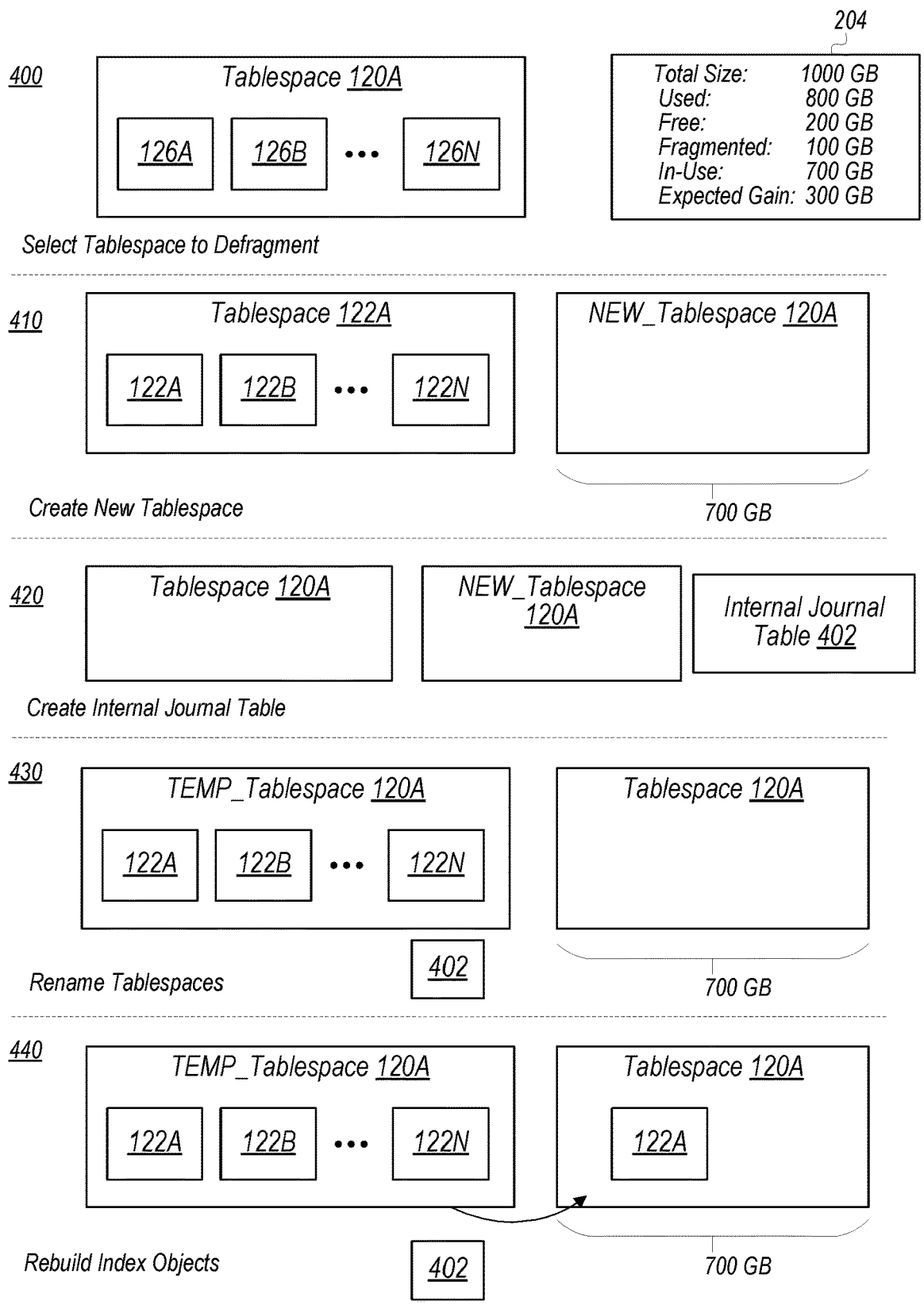

FIG. 4A-4B depict a series of block diagrams 400-460 graphically depicting various stages in the process of index rebuilder module 108 autonomously performing defragmentation operations on a tablespace 120 stored in database 104, according to some embodiments. Note that the diagrams shown in FIGS. 4A-4B are not intended to limit the scope of the present disclosure but, instead, are intended to aid in the understanding of some of the disclosed embodiments.

In block diagram 400, in the illustrated embodiment, index rebuilder module 108 accesses fragmentation information 204 that indicates usage information, including the amount of fragmentation, of various tablespaces 120 in database 104. In the portion of fragmentation information 204 depicted in diagram 400, fragmentation information 204 specifies information corresponding to tablespace 120A, including the total size of the tablespace 120A (e.g., 1000 GB), the size of the "used" portion (that is, both the "in-use" portion and the fragmented portion) of tablespace 120A (e.g., 800 GB), the size of the available portion of tablespace 120A (e.g., 200 GB), the size of the fragmented portion of tablespace 120A (e.g., 100 GB), the size of the in-use portion (e.g., 700 GB), and the expected gain to be realized through defragmentation (e.g., 300 GB). In the depicted embodiment, index rebuilder module 108 selects tablespace 120A to defragment first based on fragmentation information 204 indicating that tablespace 120A has a highest amount of fragmentation of the various tablespaces 120A-120N. Note that, in the depicted embodiment, tablespace 120A includes various index objects 122A-122N.

In diagram 410, in the illustrated embodiment, index rebuilder module 108 creates a new tablespace (e.g., "NEW_Tablespace 120A") that is at least the size of (and, in some particular embodiments, the same size as) the in-use portion of the selected tablespace 120A to provide the space necessary to store the live data from the selected tablespace 120A. In the depicted embodiment, for example, index rebuilder module 108 creates the new tablespace to be 700 GB in size, the same size as the in-use portion of the selected tablespace 120A. Note, however, that, in some embodiments, index rebuilder module 108 may create the new tablespace to be larger than the size of the in-use portion of the selected tablespace (e.g., 5% larger, 10% larger, 15% larger, etc.) to provide an additional "buffer."

In diagram 420, in the illustrated embodiment, index rebuilder module 108 creates an internal journal table 402 that records any data modification operations performed on the various index objects 122A-122N while performing the defragmentation operation on the selected tablespace 120A. In various embodiments, the use of the internal journal table 402 helps facilitate performing the defragmentation operations (and, more specifically, the autonomous index rebuilding) in an online manner because the DMLs that are happening on the index objects 122A-122N in the selected tablespace 120A during the rebuilding process are reflected in the internal journal table 402. As discussed below, in various embodiment, the internal journal table 402 may be used to synchronize the changes made to the index objects 122A-122N during the rebuilding process.

In diagram 430, in the illustrated embodiment, index rebuilder module 108 modifies the internal names for the selected tablespace 120A and the new tablespace (e.g., NEW_Tablespace 120A) to ensure that the logical storage definition does not change for the indexes 122A-122N in the selected tablespace 120A. In the non-limiting example depicted in FIG. 4A, for instance, index rebuilder module 108 renames the selected tablespace 120A to "TEMP_Tablespace 120A" and renames the newly created tablespace to "Tablespace 120A." In some embodiments, once the selected tablespace 120A is renamed to "TEMP_Tablespace 120A," index rebuilder module 108 will also change the logical tablespace storage name for the index objects 122A-122N to "TEMP_Tablespace 120A." In diagram 440, in the illustrated embodiment, index rebuilder module 108 rebuilds the index objects 122A-122N from the selected tablespace to the newly created tablespace. As one non-limiting example, the following Oracle™ command may be used to rebuild an index object from the selected tablespace to the newly created tablespace: alter index {index_name} rebuild online tablespace {tablespace_name}. According to various embodiments, once an index 122A-122N is rebuilt in the new tablespace, the logical storage name for that index will be set back to the original name of the selected tablespace (e.g., to "120B" from "TEMP_120B").

Turning now to FIG. 4B, in diagram 450, in the illustrated embodiment, index rebuilder module 108 uses the internal journal table 402 to synchronize the index objects 122A-122N from the selected tablespace 120A and with the newly rebuilt versions of those index objects 122A-122N in the new tablespace. For example, in various embodiments, the internal journal table 402 includes information specifying one or more data modification operations performed on index objects 122 while those objects were being copied to the new tablespace (e.g., as depicted in block diagram 440). In various embodiments, index rebuilder module 108 may read this data modification information from the internal journal table 402 (e.g., the Oracle™ internal journal) and apply those data modifications to the copy of the index objects 122 stored in the new tablespace 120A. After this synchronization is performed, in such embodiments, the index objects 122 stored in the new tablespace 120A and the index objects 122 stored in the selected tablespace (e.g., TEMP_Tablespace 120A) will contain the same data and are, effectively, copies of one another, with the copy in the new tablespace 120A being stored in a defragmented, more-efficient manner than the original, fragmented copy in the selected tablespace. Note that, in various embodiments, the internal journal table 402 may be dropped by the index rebuilder module 108 automatically once the rebuild process is complete. In instances in which there are rebuild failures and the journal table 402 does not clean-up automatically, index rebuilder module 108, according to some embodiments, will perform the journal clean-up process.

In diagram 460, in the illustrated embodiment, index rebuilder module 108 reclaims storage space used to store at least a portion of the selected tablespace 120. For example, in some embodiments, once all of the index objects 122 are moved from the selected tablespace 120 (e.g., TEMP_Tablespace 120A) to the new tablespace 120 (e.g., Tablespace 120A), the selected tablespace 120 will be empty and will be dropped by the index rebuilder module 108 to release the storage space held by the selected tablespace to the automatic storage management system of the database management system 110. As described elsewhere herein, index rebuilder module 108, in various embodiments, may repeat this process to autonomously perform defragmentation on multiple (potentially numerous) tablespaces 120 stored in database 104, optionally at an off-peak time for the server system 102.

Example Methods

Referring now to FIG. 5, a flow diagram illustrating an example method 500 for performing database defragmentation operations by autonomously redefining tables stored in the database is depicted, according to some embodiments. In various embodiments, method 500 may be performed by one or more of the modules executing on database server 105 of FIG. 2, such as the table redefinition module 106, fragmentation analyzer module 202, governance framework 206, pre-check module 208, or job watcher module 210, to autonomously perform defragmentation operations on one or more tables 124 stored in database 104. For example, database server 105 may include (or have access to) a non-transitory, computer-readable medium having program instructions stored thereon that are executable by the database server 105 to cause the operations described with reference to FIG. 5. In FIG. 5, method 500 includes elements 502-522. While these elements are shown in a particular order for ease of understanding, other orders may be used. In various embodiments, some of the method elements may be performed concurrently, in a different order than shown, or may be omitted. Additional method elements may also be performed as desired.

At 502, in the illustrated embodiment, the table redefinition module 106 accesses fragmentation information 204 corresponding to a plurality of tables 124 in a database 104 where, for a given one of the plurality of tables 124, defragmentation information 204 indicates an amount of fragmentation of the given table. For example, in some embodiments, fragmentation analyzer module 202 is operable to analyze the plurality of tables to generate the fragmentation information 204 prior to autonomously performing the defragmentation operations.

At 504, in the illustrated embodiment, the pre-check module 208 performs one or more preliminary checks. For example, in some embodiments, prior to performing the defragmentation operations, pre-check module 208 may perform at least one of the following types of preliminary checks: determining whether there is a sufficient amount of storage space available to perform the defragmentation operations, verifying that the defragmentation operations are being performed during a period of decreased demand (that is, during an "off-peak" time), and determining whether any suspension windows are currently active. In some such embodiments, in response to a determination that one or more of the preliminary checks were unsuccessful, method 500 may include aborting the defragmentation operations.

At 506, in the illustrated embodiment, the table redefinition module 106 autonomously performs defragmentation operations on one or more of the tables 124. In the depicted embodiment, element 506 includes sub-elements 508 through 520. Note, however, that this embodiment is provided merely as one non-limiting example. In other embodiments, element 506 may include additional, fewer, or different sub-elements, as desired. At 508, in the illustrated embodiment, the table redefinition module 106 selects a table to defragment based on the fragmentation information 204. As discussed above, in some embodiments, table redefinition module 106 is operable to autonomously defragment tables 124 in order from most to least fragmented. For example, in some embodiments, table redefinition module 106 may select the table 124 that has a highest percentage of fragmentation of the plurality of tables. In other embodiments, table redefinition module 106 may select the table 124 that has the largest amount (specified, for example, in gigabytes) of fragmented storage space of the plurality of tables. In still other embodiments, table redefinition module 106 may select the table 124 based on its relative level of "importance" as compared to the other tables 124 eligible for defragmentation.

At 510, in the illustrated embodiment, the table redefinition module 106 creates a materialized view log based on the selected table. For example, as discussed above with reference to FIG. 3, table redefinition module 106 may create a materialized view log 302 that includes duplicate data that stored in the selected table such that any data modification operations performed on the selected table will also have a corresponding entry in the materialized view log 302. Stated differently, prior to copying the data from the selected table to an interim table, various embodiments of method 500 include creating a materialized view log based on the selected table such that, for a given one of one or more data modification operations serviced while performing the defragmentation operations on the selected table, a corresponding entry is created in the materialized view log.

At 512, in the illustrated embodiment, table redefinition module 106 copies data from the selected table to an interim table such that the interim table is stored in the database 104 without the fragmentation of the selected table. For example, in some embodiments, table redefinition module 106 may create a skeleton interim table as part of the defragmentation operations. In some embodiments, this interim table may be created in the same tablespace as the selected table. In other embodiments, however, table redefinition module 106 may create the interim table and a tablespace that is different than the tablespace of the selected table. For example, in some embodiments, the selected table is stored in a first tablespace 120 of the database 104 and, as part of performing the defragmentation operations on the selected table, the table redefinition module 106 may create the interim table in a second, different tablespace 120 in the database. Further, note that, in various embodiments, the interim table may differ from the selected table in one or more respects. For example, in some embodiments, the selected table may include a plurality of columns and, as part of performing the defragmentation operations on the selected table, table redefinition module 106 may create the interim table such that a datatype of a first one of the plurality of columns is changed from a first datatype to a second, different datatype. Additionally, in some embodiments, table redefinition module 106 is operable to redefine a selected table as a partitioned table.

At 514, in the illustrated embodiment, method 500 includes servicing one or more request to perform a data modification operation on the selected table while performing the defragmentation operations on that table. For example, in some embodiments, table redefinition module 106 is operable to autonomously perform the defragmentation operations on one or more tables 124 in an online manner such that database management system 110 may continue to service data access or data modification requests (e.g. originating from users 130) while the defragmentation operations are performed. At 516, in the illustrated embodiment, table redefinition module 106 is operable to synchronize the data stored in the selected table and the interim table based on the materialized view log 302. For example, as described in detail above, table redefinition module 106 may, during this synchronization process, read data changes from the materialized view log 302 and apply those changes to the interim table so as to account for any data modification operations performed on the selected table while the data was being copied (e.g. an element 512). Stated differently, in some embodiments, element 516 includes synchronizing the data in the interim table with the data in the selected table using the materialized view log such that, after the synchronizing, the data in the interim table reflects the one or more data modification operations performed on the selected table during defragmentation operations.

At 518, in the illustrated embodiment, table redefinition module 106 exchanges internal names for the selected table in the interim table. For example, in some embodiments, exchanging the internal names for the selected table and the interim table allows the new, more-efficient version of the table to be used in production and the older, less-efficient version of the table to be dropped from storage. At 520, in the illustrated embodiment, subsequent to copying the data from the selected table to the interim table, table redefinition module 106 is operable to reclaim the storage space used to store at least a portion of the selected table such that the previously wasted storage space is returned to (that is, made available for storing additional data in) the tablespace. At 522, in the illustrated embodiment, table redefinition module 106 determines whether there are any remaining tables 124 to defragment. For example, in some embodiments, table redefinition module 106 is operable to autonomously perform defragmentation operations on multiple tables. In one non-limiting embodiment for example, table redefinition module 106 may autonomously perform the defragmentation operations on each of a subset of the plurality of tables for which an amount of fragmentation exceeds a particular fragmentation threshold (e.g., greater than 25%, more than 50 GB of fragmented storage space, or any other specified fragmentation threshold value). Further, in some embodiments, table redefinition module 106 is operable to perform the defragmentation operations on the subset of tables in order from most fragmented (e.g., in terms of fragmentation percentage or absolute size of fragmentation) to least fragmented. In the depicted embodiment, if there are no remaining tables to defragment, method 500 ends. If, however, there are remaining tables to defragment, method 500 returns to element 508, where elements 508 through 520 may be repeated, according to the depicted embodiment. Note, however, that in some embodiments, if table redefinition module 106 determines at element 522 that there are additional tables to defragment, method 500 may instead return to other elements, such as element 502 or 504.

As noted above, in various embodiments, method 500 may include additional elements not specifically depicted in FIG. 5 (for clarity). For example, in some embodiments, autonomously performing defragmentation operations on one or more tables 124 may include monitoring the database 104 to determine whether to interrupt the defragmentation operations. For example, in some embodiments, job watcher module 210 is operable to monitor one or more aspects of the database server 105 (or database 104), such as the number of user connections being blocked by the defragmentation operations or the number of active sessions executing on the database server 105. In some such embodiments, in response to the number of active sessions exceeding a particular threshold value or the number of user connections being blocked exceeding a threshold value, the job watcher module 210 may terminate one or more of the active sessions or terminate the defragmentation operations. Further note that, in some embodiments, method 500 may include one or more operations performed by governance framework 206. For example, in one non-limiting embodiment, prior to copying the data from the selected table to the interim table, governance framework 206 may create a logical lock on the selected table (e.g., table 124A) such that it is not accessible to one or more processing jobs and, subsequent to copying the data from the selected table to the interim table, the governance framework 206 may then remove the logical lock on selected table.

Figure 6:
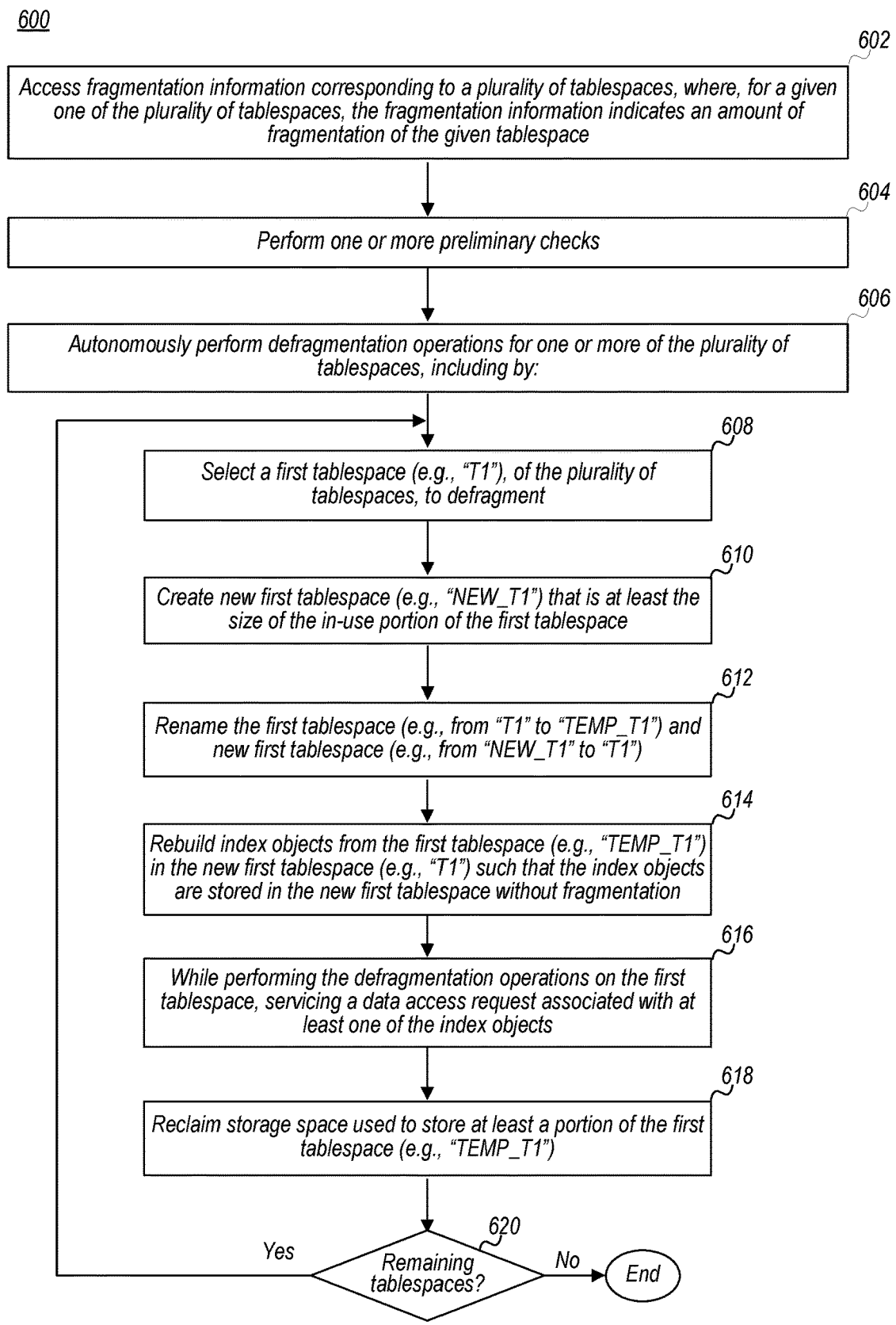
FIG. 6 depicts a flow diagram illustrating an example method for performing database defragmentation operations by autonomously rebuilding index objects stored in one or more tablespaces of the database, according to some embodiments.

Referring now to FIG. 6, a flow diagram illustrating an example method 600 for performing database defragmentation operations by autonomously rebuilding index objects stored in one or more tablespaces of the database is depicted, according to some embodiments. In various embodiments, method 600 may be performed by one or more of the modules executing on database server 105 of FIG. 2, such as index rebuilder module 108, fragmentation analyzer module 202, governance framework 206, pre-check module 208, or job watcher module 210, to autonomously perform defragmentation operations. For example, database server 105 may include (or have access to) a non-transitory, computer-readable medium having program instructions stored thereon that are executable by the database server 105 to cause the operations described with reference to FIG. 6. In FIG. 6, method 600 includes elements 602-620. While these elements are shown in a particular order for ease of understanding, other orders may be used. In various embodiments, some of the method elements may be performed concurrently, in a different order than shown, or may be omitted. Additional method elements may also be performed as desired.

At 602, in the illustrated embodiment, index rebuilder module 108 accesses fragmentation information 204 corresponding to a plurality of tablespaces 120 in a database 104, where, for a given one of the plurality of tablespaces 120, defragmentation information 204 indicates an amount of fragmentation of the given tablespace. For example, in some embodiments, fragmentation analyzer 202 is operable to analyze data objects stored in the plurality of tablespaces to generate the fragmentation information 204 corresponding to the plurality of tablespaces 120 prior to the index rebuilder module 108 autonomously performing the defragmentation operations.

At 604, in the illustrated embodiment, the pre-check module 208 performs one or more preliminary checks. For example, in some embodiments, prior to performing the defragmentation operations, pre-check module 208 may perform at least one of the following types of preliminary checks: determining whether there is a sufficient amount of storage space available perform the defragmentation operations, verifying that the defragmentation operations are being performed during a period of decreased demand, and determining whether any suspension windows are currently active. In some such embodiments, in response to a determination that one or more of the preliminary checks were unsuccessful, method 600 may include aborting defragmentation operations until a later time.

At 606, in the illustrated embodiment, the index rebuilder module 108 autonomously performs defragmentation operations on one or more of the plurality of tablespaces 120. In the depicted embodiment, element 606 includes sub elements 608-618. Note, however, that this embodiment is provided merely as one non-limiting example. In other embodiments, element 606 may include additional, fewer, or different sub elements, as desired. At 608, in the illustrated embodiment, index rebuilder module 108 selects a first tablespace, of the plurality of tablespaces, to defragment. As discussed above, in some embodiments, index rebuilder module 108 is operable to autonomously defragment tablespaces 120 in order from most to least fragmented. For example, in some embodiments, index rebuilder module may, at element 608, select the first tablespace by determining that the first tablespace has a highest percentage of fragmentation of the plurality of tablespaces. Note, however, that this embodiment is provided merely as one non-limiting example. In other embodiments, index rebuilder module 108 may select the first tablespace by determining that it has a largest amount of fragmented storage space of the plurality of tablespaces or using any of various other suitable selection techniques.

At 610, in the illustrated embodiment, index rebuilder module 108 creates a new first tablespace that is at least the size of the in-use portion of the first tablespace. For example, in some embodiments, fragmentation information 204 may directly indicate the size of the in-use portion of the first tablespace. In other embodiments, however, index rebuilder module 108 may determine the size of the in-use portion of the first tablespace based on the fragmentation information 204 by subtracting the size of the fragmented portion of the first tablespace from the size of the used portion of the first tablespace. Note that, in some embodiments, the new first tablespace may be larger than the size of the in-use portion of the first tablespace (e.g., 5% larger, 10% larger, 15% larger, etc.) to provide a "buffer." At 612, in the illustrated embodiment, index rebuilder module 108 renames the first tablespace and the new first tablespace. For example, as discussed above with reference to FIG. 4, modifying the internal names for the first tablespace and the new first tablespace may, in some embodiments, ensure that the logical storage definition does not change for the various indexes 122 in the first tablespace 120.

At 614, in the illustrated embodiment, index rebuilder module 108 rebuilds index objects 122, from the first tablespace, in the new first tablespace such that the index objects are stored in the new first tablespace without fragmentation. At 616, in the illustrated embodiment, method 600 includes servicing a data access request associated with at least one of the index objects 122 while performing the defragmentation operations on the first tablespace 120. For example, in some embodiments, index rebuilder module 108 is operable to autonomously perform the defragmentation operations on one or more of the tablespaces 120 in an online manner such that data management system 110 may continue to service data access or data modification requests (e.g., originating from users 130) while the defragmentation operations are performed. At 618, in the illustrated embodiment, index rebuilder module 108 is operable to reclaim storage space used to store least a portion of the first tablespace. For example, in some embodiments, reclaiming the storage space includes deleting the first tablespace from the database such that the storage space used to store the first tablespace is made available to the database management system 110. In other embodiments, however, reclaiming the storage space may include releasing the storage space such that it may be used to store other database objects in the new first tablespace.

At 620, in the illustrated embodiment, index rebuilder module 108 determines whether there are any remaining tablespaces to defragment. For example, in some embodiments, index rebuilder module 108 is operable to autonomously perform defragmentation operations on multiple tablespaces. In one non-limiting embodiment, for example, index rebuilder module 108 may autonomously perform defragmentation operations on each of a subset of the plurality of tablespaces for which an amount of fragmentation exceeds a particular fragmentation threshold (specified, for example, in terms of fragmentation percentage or absolute size of fragmentation). For example, in some such embodiments, a subset of the plurality of tablespaces may have respective amounts of fragmentation that exceed a particular fragmentation threshold. In some such embodiments, method 600 may further include autonomously performing the defragmentation operations for each of the subset of tablespaces. In the depicted embodiment, if there are no remaining tablespaces, to defragment at element 620, method 600 ends. If, however, there are remaining tablespaces to defragment, method 600 returns to element 608, where elements 608-618 may be repeated, according to the depicted embodiment. Note, however, that in some embodiments, if index rebuilder module 108 determines at element 620 that there are additional tablespaces to defragment, method 600 may instead return to other elements, such as element 602 or 604.

As noted above, in various embodiments, method 600 may include additional elements not specifically depicted in FIG. 6 (for clarity). For example, in some embodiments, autonomously performing defragmentation operations on the first tablespace may include recording, in a journal table, information corresponding to one or more data modifications made, during the defragmentation operations on the first tablespace, to a particular one of the first plurality of index objects in the first tablespace. In some such embodiments, subsequent to rebuilding the first plurality of index objects, method 600 includes synchronizing the one or more data modifications to the rebuilt particular index object in the new first tablespace. Further, in some embodiments, autonomously performing defragmentation operations on the one or more tablespaces may include monitoring the database server 105 or database 104 to determine whether to interrupt these defragmentation operations. Stated differently, in various embodiments, job watcher module 210 may monitor a plurality of metrics associated with operations being performed by database server 105 or on the database 104 and, based on that monitoring, autonomously terminate one or more of the operations. For example, in some embodiments, job watcher module 210 may monitor a number of active sessions executing on the database server 105 (or utilizing database 104) and, in response to the number of active sessions exceeding a particular threshold value, may terminate one or more of the active sessions. Additionally, in some embodiments, job watcher module 210 may monitor a number of user connections being blocked by autonomously performing the defragmentation operations and, in response the number of user connections being blocked exceeding a particular threshold value, may terminate or delay the defragmentation operations. Further, note that in some embodiments, method 600 may include one or more operations performed by governance framework 206. For example, in one non-limiting embodiments, index rebuilder module 108 may receive, from the governance framework module 206 (e.g., via an API call) an indication that a suspension window is active for one or more the plurality of index objects and, in response to this indication, automatically suspend the defragmentation operations on the first tablespace. Further, in some embodiments, prior to rebuilding a particular one of the first plurality of index objects, index rebuilder module 108 may send a request to governance framework 206 to create a logical lock on the particular index objects such that the particular index object is not accessible to one or more other jobs (e.g., maintenance jobs). Subsequent to rebuilding the particular index objects in the new first tablespace, index rebuilder module 108 may then send a request to the governance framework 206 to remove the logical lock on the particular index object.

Figure 7:
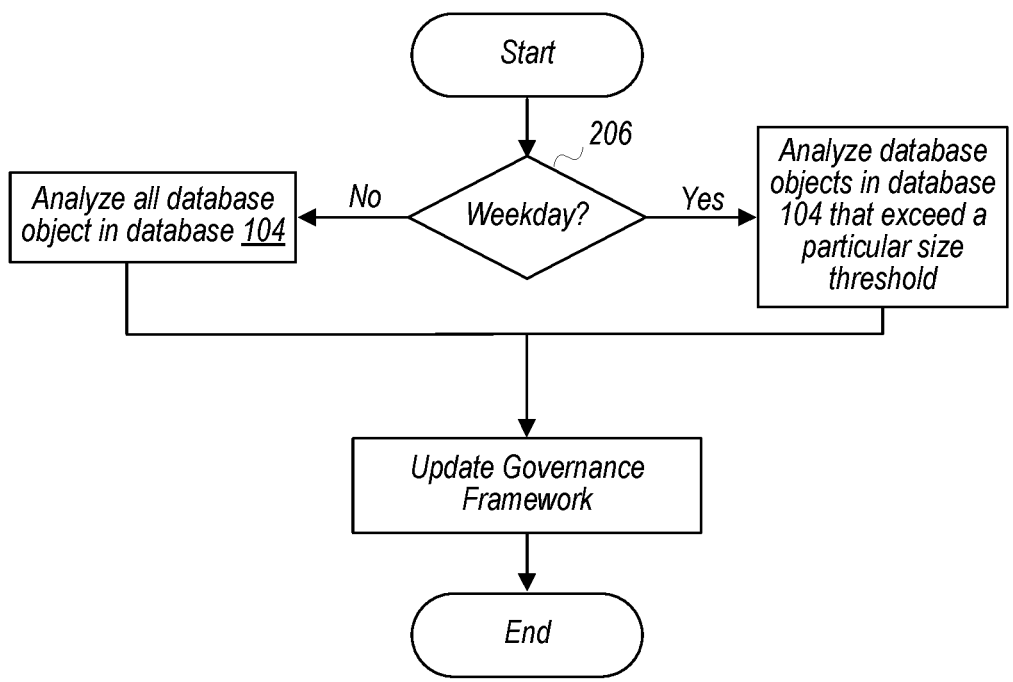
FIG. 7 depicts a flow diagram illustrating an example method for analyzing one or more database objects to generate fragmentation information, according to some embodiments.

FIG. 7 depicts a flow diagram illustrating an example method 700 for analyzing one or more database objects to generate fragmentation information 204, according to some embodiments. For example, as described above with reference to FIG. 2, fragmentation analyzer 202, in various embodiments, is operable to analyze database objects in database 104 to determine various items of usage information about the database objects, including information indicating the amount of fragmentation of the objects, and write that information to one or more log files, such as usage log 203. For example, database server 105 may include (or have access to) a non-transitory, computer-readable medium having program instructions stored thereon that are executable by the database server 105 to cause the operations described with reference to FIG. 7. In some embodiments, fragmentation analyzer 202 is configured to analyze various database objects according to a user-specified schedule. Method 700 depicted in FIG. 7 depicts one non-limiting example of the manner in which fragmentation analyzer 202 may operate according to a user-specified schedule. In FIG. 7, method 700 includes elements 702-708. While these elements are shown in a particular order for ease of understanding, other orders may be used. In various embodiments, some of the method elements may be performed concurrently, in a different order than shown, or may be omitted. Additional method elements may also be performed as desired.

In the depicted embodiment, fragmentation analyzer 202 is configured to run every day, analyzing all database objects stored in database 104 on weekends and analyzing only those database objects that exceed a particular size threshold (e.g., 1 GB) on the weekdays. As will be appreciated by one of skill in the art with the benefit of this disclosure, this embodiment is provided merely as one non-limiting example and, in other embodiments, fragmentation analyzer 202 may operate according to any of various other suitable schedules, as desired. At 702, in the illustrated embodiment, the fragmentation analyzer 202 determines whether, at the time of its current execution, it is a weekday. If not, method 700 proceeds to element 704, where it proceeds to iteratively analyze all of the database objects in the database 104 to generate fragmentation information 204 about the objects. In instances in which database 104 is implemented using an Oracle™ database, fragmentation analyzer 202 may generate at least a portion of the fragmentation information 204 using the Oracle™ DBMS_SPACE package, as one non-limiting example. Once it has determined the fragmentation information 204 for a given database object (e.g., table 124, index 122, tablespace 120, etc.), fragmentation analyzer 202 may write or update the fragmentation information 204 to reflect this most-recent analysis.

If, however, fragmentation analyzer 202 determines at element 702 that its current execution is being performed on a weekday, method 700 proceeds to element 706, where it proceeds to analyze all of the database objects in database 104 that exceed the particular size threshold. For example, in one non-limiting embodiment, fragmentation analyzer 202 may identify all database objects in the database 104 that exceed the particular size threshold (e.g., using one or more queries configured to retrieve database objects that exceed the particular size threshold) and, for each of the identified database objects, determine one or more items of usage information. In the depicted embodiment, method 700 then proceeds to element 708, at which the fragmentation analyzer 202 may write or update the fragmentation information 204 to reflect this most-recent analysis.

Figure 8:
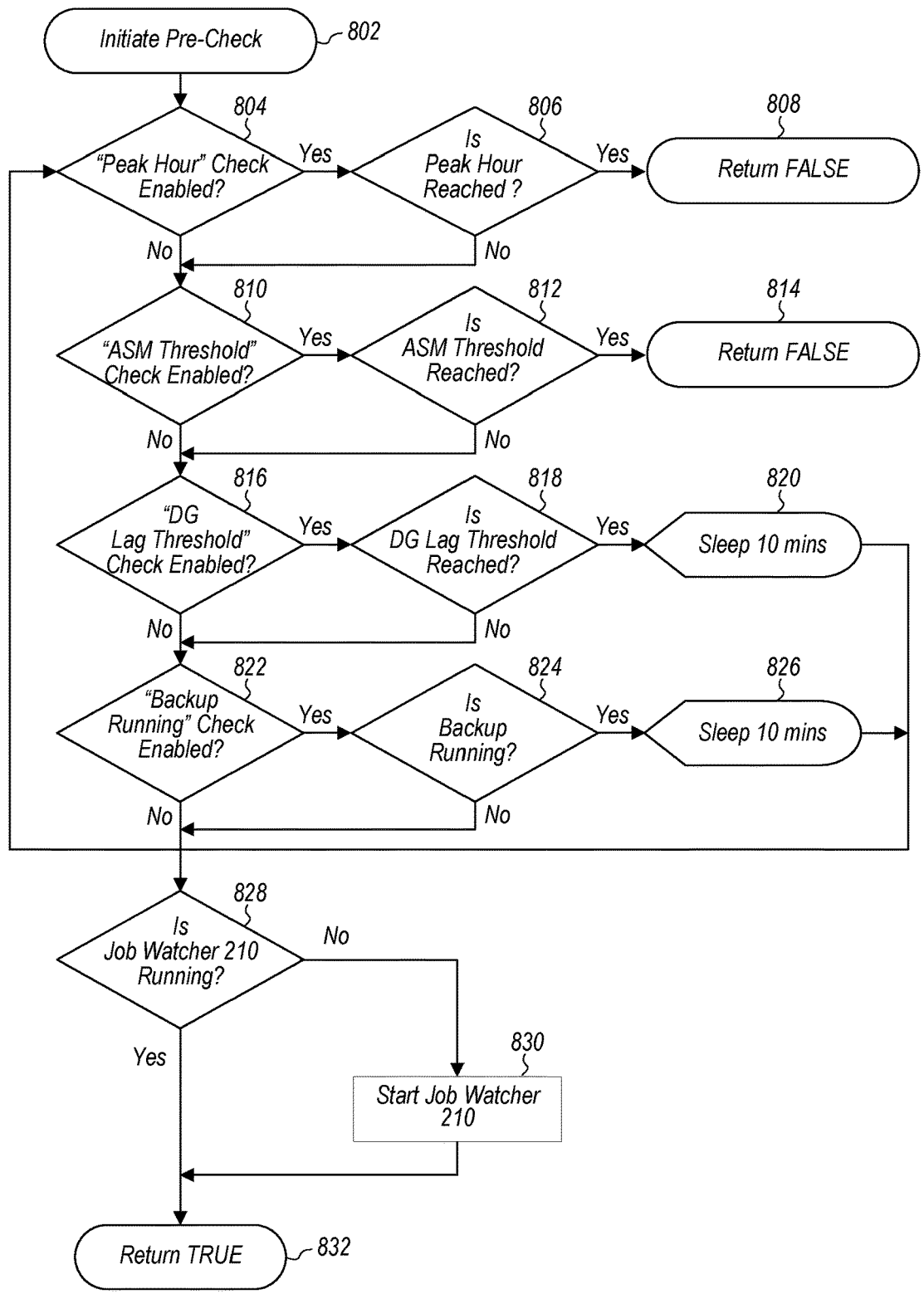
FIG. 8 depicts a flow diagram illustrating an example method for performing preliminary checks on various conditions relating to the status of a database or database server, according to some embodiments.

FIG. 8 depicts a flow diagram illustrating an example method 800 for performing preliminary checks on various conditions relating to the status of database 104 or the database server 105, according to some embodiments. For example, as described above with reference to FIG. 2, pre-check module 208, in various embodiments, is operable to check various conditions relating to the status of the database server 105 or the database 104 prior to (or at one or more points during) the defragmentation operations performed by table redefinition module 106 or index rebuilder module 108. In various embodiments, pre-check module 208 is operable to perform one or more preliminary checks and provide a return value (e.g., to the module that invoked the pre-check module 208, such as the governance framework 206) indicating whether the preliminary checks were successful (e.g., as indicated through a Boolean "TRUE") or unsuccessful (e.g., indicated using a Boolean "FALSE").

In various embodiments, pre-check module 208 may be configured as desired such that the particular checks performed by pre-check module 208 may vary depending, for example, on the type of defragmentation operations to be performed, the day or time that the pre-check module 208 is operating, etc. For example, in some embodiments, a user (e.g., a DBA) is able to configure various settings associated with the pre-check module 208, determining whether to enable the various checks that the pre-check module 208 is operable to perform and, if enabled, specify one or more threshold values that the pre-check module 208 may use evaluate the specified check. As will be appreciated by one of skill in the art with the benefit of this disclosure, the configuration settings for pre-check module 208 may be specified in any of various suitable formats. In one non-limiting embodiment, for example, the configuration settings may be specified in a "config" file that, for the various checks available, indicates whether the check is enabled (e.g., as indicated by setting an "enabled" variable to "true" or "false") and parameters for one or more threshold values used to evaluate the check. Method 800 depicted in FIG. 8 illustrates one non-limiting example of the manner in which pre-check module 208 may operate to perform various preliminary checks, according to some embodiments. For example, database server 105 may include (or have access to) a non-transitory, computer-readable medium having program instructions stored thereon that are executable by the database server 105 to cause the operations described with reference to FIG. 8. In FIG. 8, method 800 includes elements 802-832. While these elements are shown in a particular order for ease of understanding, other orders may be used. In various embodiments, some of the method elements may be performed concurrently, in a different order than shown, or may be omitted. Additional method elements may also be performed as desired.

Method 800 begins at 802 at which the preliminary check operations are initiated. At 804, in the illustrated embodiment, pre-check module 208 determines whether a "peak hour" check has been enabled. If not, method 800 proceeds to element 810, described below. If, however, pre-check module 208 determines that the "peak hour" check has been enabled, method 800 proceeds to 806, where pre-check module 208 determines whether a "peak" hour has been reached. For example, in some embodiments, pre-check module 208 may compare the current time to a value specifying a "peak" hour. As one non-limiting example, it may be determined that the "peak" hours (e.g., for the server system 102, database 104, database server 105, or any other element of server system 102) are between 4 PM and 9 PM eastern standard time. In various embodiments, a user associated with the server system 102 (e.g., a DBA) may not want to perform defragmentation operations on the database 104 during these "peak" hours so as to not unnecessarily burden the database 104 or database server 105. As such, in the depicted embodiment, pre-check module 208 may verify that the current time does not coincide with the specified "peak" hour(s). If a "peak" hour has been reached, method 800 proceeds to element 808, at which a "FALSE" value is returned by the pre-check module 208. If not, method 800 instead proceeds to element 810.

At 810, in the illustrated embodiment, pre-check module 208 determines whether an "ASM threshold" check is enabled. If not, method 800 proceeds to element 816, described below. If, however, pre-check module 208 determines that the "ASM threshold" check has been enabled, method 800 proceeds to element 812, where pre-check module 208 determines whether there is a sufficient amount of storage space available to the automatic storage management ("ASM") system of the database management system 110. For example, in some embodiments, it may be necessary to have at least a threshold amount of storage space available to the ASM so that the defragmentation operations described herein can be performed (e.g., such that a new tablespace 120A may be created or data copied from a selected table 124A to an interim table 124A). If the ASM threshold has been reached, method 800 proceeds to element 814, at which a "FALSE" value is returned by the pre-check module 208. If not, method 800 instead proceeds to element 816.

At 816, in the illustrated embodiment, pre-check module 208 determines whether the "DG lag threshold reached" check is enabled. If not, method 800 proceeds to element 822, described below. If, however, pre-check module 208 determines that the "DG lag threshold reached" check has been enabled, method 800 proceeds to element 818, where pre-check module 208 determines whether a delay or "lag" associated with a "Data Guard" service is exceeding a particular threshold value. In embodiments in which the database 104 is implemented as an Oracle™ database, for example, database management system 110 may include the Oracle™ Data Guard extension that provides various data protection and disaster recovery services for the database 104. If the DG lag threshold has been reached, method 800 proceeds to element 820, at which the pre-check module 208 "sleeps" for 10 minutes (or any other suitable amount of time, as desired) before returning to element 804. If the DG lag threshold has not been reached, method 800 instead proceeds to element 822.

At 822, in the illustrated embodiment, pre-check module 208 determines whether a "backup running" check is enabled. If not, method 800 proceeds to element 828, described below. If, however, pre-check module 208 determines that the "backup running" check is enabled, method 800 proceeds to element 824, where pre-check module 208 determines whether a backup operation is currently running on the database 104. If a backup operation is currently running, method 800 proceeds to element 826, at which the pre-check module 208 "sleeps" for 10 minutes (or any other suitable amount of time, as desired) before returning to element 804. If there are no backup operations currently running, method 800 instead proceeds to element 828. At 828, in the illustrated embodiment, pre-check module 208 determines whether an instance of the job watcher module 210 is currently running. If so, method 800 proceeds to element 832, at which a "TRUE" value is returned by the pre-check module 208. If an instance of the job watcher module 210 is not yet running, however, pre-check module 208 starts the job watcher 210 at element 830 before returning a "TRUE" value.

Figure 9:
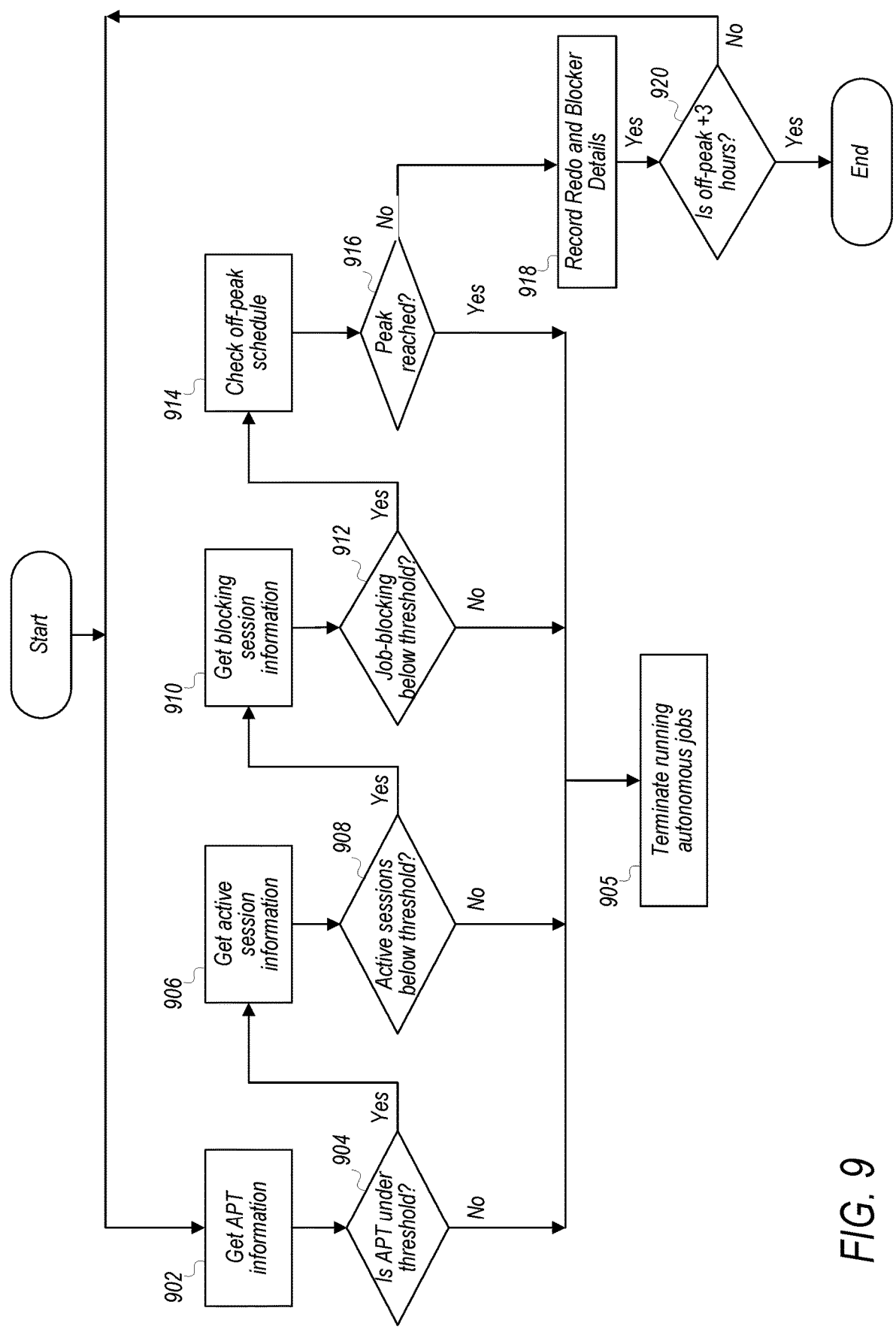
FIG. 9 depicts a flow diagram illustrating an example method for monitoring a database to determine whether to interrupt defragmentation operations being performed on the database, according to some embodiments.

FIG. 9 depicts a flow diagram illustrating an example method 900 for monitoring database 104 to determine whether to interrupt defragmentation operations being performed by table redefinition module 106 or index rebuilder module 108. For example, in various embodiments, job watcher module 210 is operable to monitor various aspects of database 104 or database server 105 during the defragmentation operations (as well as during other operations that are performed on the database 104 or database server 105, in some embodiments), eliminating the need for manual monitoring on the part of one or more (and, typically, many) DBAs. For example, database server 105 may include (or have access to) a non-transitory, computer-readable medium having program instructions stored thereon that are executable by the database server 105 to cause the operations described with reference to FIG. 9. The specific aspects of database 104 or database server 105 monitored by job watcher module 210 may vary, according to different embodiments. In FIG. 9, method 900 depicts one non-limiting example of the conditions that job watcher module 210 may monitor while defragmentation operations are being performed on database 104. In FIG. 9, method 900 includes elements 902-920. While these elements are shown in a particular order for ease of understanding, other orders may be used. Additionally, note that some of the method elements may be performed concurrently, in a different order than shown, or may be omitted. Additional method elements may also be performed as desired.

At 902, in the illustrated embodiment, job watcher module 210 gets APT information and proceeds to element 904, where job watcher module 210 determines, based on the APT information, whether the APT is under the timeout threshold. As noted above, the APT information, in various embodiments, indicates the average response time to the application. In some embodiments, at 902, job watcher module 210 verifies whether the APT is within a certain acceptable limit. If not, method 900 proceeds to element 905, where the job watcher module 210 terminates one or more running autonomous jobs (such as the defragmentation operations performed by table redefinition module 106 or index rebuilder module 108). For example, if the APT is above the acceptable limit, this implies that the application performance is degraded. In some such embodiments, as a preventative measure, one or more of the autonomous jobs (e.g., defragmentation jobs) may be suspended or terminated. If, however, the APT is under the timeout threshold, method 900 proceeds to element 906. At 906, in the illustrated embodiment, job watcher module 210 gets active session information corresponding to the active sessions on each of the database server 105 nodes that are being monitored. For example, in some embodiments, job watcher module 210 is operable to monitor the number of active sessions on each of the nodes and, if the number of active sessions exceeds a predetermined threshold number of active sessions on any of the nodes, the job watcher module 210 proceeds to terminate one or more of the jobs (e.g., a defragmentation job). In the depicted embodiment, for example, job watcher module 210 determines whether the number of active sessions is below a particular threshold value at element 908. If not, method 900 proceeds to element 905 and job watcher module 210 terminates one or more of the running autonomous jobs. If, however, the number of active sessions is below the particular threshold value, method 900 proceeds to element 910.

At 910, in the illustrated embodiment, job watcher module 210 gets blocking session information corresponding to the number of user connections that are being blocked by the one or more autonomous jobs. For example, in some embodiments, job watcher module 210 is operable to monitor whether the autonomous jobs (such as the autonomous defragmentation operations described herein) are blocking any user connections and, if the number of blocking sessions exceeds a predetermined threshold number of blocked sessions, the job watcher module 210 proceeds to terminate one or more of the jobs (e.g., a defragmentation job). In the depicted embodiment, for example, job watcher module 210 determines whether the number of user connections being blocked by the autonomous defragmentation operations is below a particular threshold value at element 912. If not, method 900 proceeds to element 905 and job watcher module 210 terminates one or more of the running autonomous jobs. If, however, the number of user connections being blocked is below the particular threshold value, method 900 proceeds to element 914.

At 914, in the illustrated embodiment, job watcher module 210 checks the "off-peak" schedule and proceeds to element 916, where job watcher module 210 determines whether a peak time has been reached. If so, method 900 proceeds to element 905 and job watcher module 210 terminates one or more of the running autonomous jobs. If, however, a peak time has not been reached, method 900 proceeds to element 918, where job watcher module 210 records information corresponding to the "redo's" generated by each of the autonomous jobs. In some embodiments, this statistical data may be used for fine-tuning the jobs or for trouble shooting operations, as desired. Method 900 then proceeds to element 920, wherein job watcher module 210 determines whether the off-peak time period will extend for the next three hours. For example, in some embodiments, job watcher module 210 operates according to a schedule and may periodically monitor the database 104 or database server 105. In the depicted embodiment, if the off-peak time period will extend for at least the next three hours, method 900 ends (potentially to be initiated again at a subsequent point during the defragmentation operations depending, for example, on an operating schedule for the job watcher module 210 or in response to being initiated by one or more of the other modules depicted in FIG. 2, such as the governance framework 206). If, however, the off-peak time period will not extend for at least the next three hours, method 900, in the depicted embodiment, returns to element 902 such that the various operations described with reference to elements 902-920 may be repeated.

Example Computer System

Figure 10:
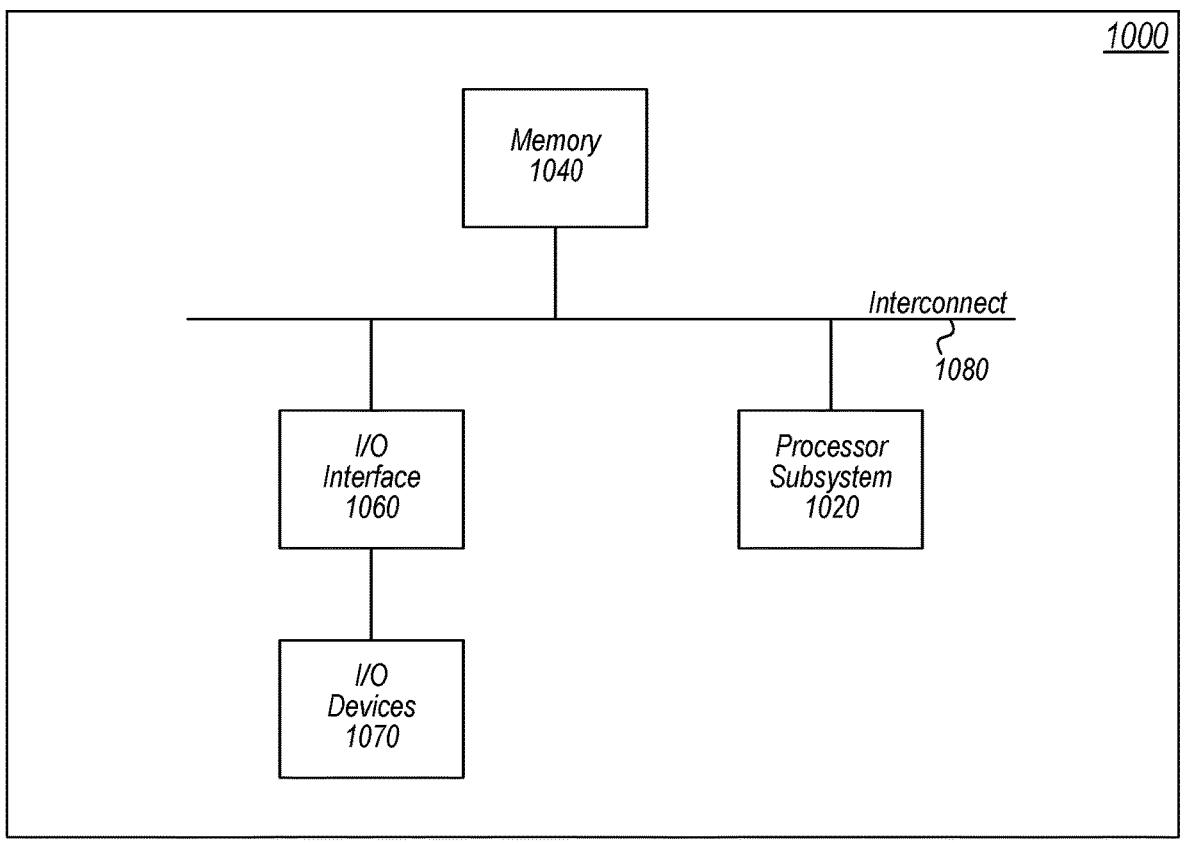
FIG. 10 is a block diagram illustrating an example computer system, according to some embodiments.

Referring now to FIG. 10, a block diagram of an example computer system 1000 is depicted, which may implement one or more computer systems, such as database server 105, web server 112, or application server 114 of FIG. 1, according to various embodiments. Computer system 1000 includes a processor subsystem 1020 that is coupled to a system memory 1040 and I/O interfaces(s) 1060 via an interconnect 1080 (e.g., a system bus). I/O interface(s) 1060 is coupled to one or more I/O devices 1070. Computer system 1000 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 1000 is shown in FIG. 10 for convenience, computer system 1000 may also be implemented as two or more computer systems operating together.

Processor subsystem 1020 may include one or more processors or processing units. In various embodiments of computer system 1000, multiple instances of processor subsystem 1020 may be coupled to interconnect 1080. In various embodiments, processor subsystem 1020 (or each processor unit within 1020) may contain a cache or other form of on-board memory.

System memory 1040 is usable to store program instructions executable by processor subsystem 1020 to cause system 1000 perform various operations described herein. System memory 1040 may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 1000 is not limited to primary storage such as system memory 1040. Rather, computer system 1000 may also include other forms of storage such as cache memory in processor subsystem 1020 and secondary storage on I/O devices 1070 (e.g., a hard drive, storage array, etc.). In some embodiments, these other forms of storage may also store program instructions executable by processor subsystem 1020.

I/O interfaces 1060 may be any of various types of interfaces configured to couple to and communicate with other devices, according to various embodiments. In one embodiment, I/O interface 1060 is a bridge chip (e.g., Southbridge) from a front-side to one or more back-side buses. I/O interfaces 1060 may be coupled to one or more I/O devices 1070 via one or more corresponding buses or other interfaces. Examples of I/O devices 1070 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 1070 includes a network interface device (e.g., configured to communicate over WiFi, Bluetooth, Ethernet, etc.), and computer system 1000 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

In this disclosure, various "modules" operable to perform designated functions are shown in the figures and described in detail above (e.g., table redefinition module 106, index rebuilder module 108, fragmentation analyzer module 202, governance framework 206, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Example Embodiments

The following numbered paragraphs set out additional non-limiting embodiments.

1. A method, comprising:
   autonomously performing, by a computer system, defragmentation operations for one or more of a plurality of tablespaces in a database, including by:
   selecting a first tablespace, of the plurality of tablespaces, to defragment, wherein the first tablespace includes a first plurality of index objects;
   creating a new first tablespace that is at least a same size as an in-use portion of the first tablespace;
   rebuilding the first plurality of index objects, from the first tablespace, in the new first tablespace such that the rebuilt first plurality of index objects are stored in the new first tablespace without fragmentation;
   while performing the defragmentation operations on the first tablespace, servicing a data access request associated with at least one of the first plurality of index objects; and
   reclaiming storage space used to store at least a portion of the first tablespace.

2. The method of embodiment 1, wherein the reclaiming the storage space includes deleting the first tablespace from the database such that the storage space used to store the first tablespace is made available to a database management system.

3. The method of embodiment 1, wherein the reclaiming the storage space includes releasing the storage space such that it may be used to store other database objects in the new first tablespace.

4. The method of embodiment 1, wherein the selecting the first tablespace to defragment includes determining that the first tablespace has a highest percentage of fragmentation of the plurality of tablespaces.

5. The method of embodiment 1, wherein a subset of the plurality of tablespaces have respective amounts of fragmentation that exceed a particular fragmentation threshold, wherein the method further comprises autonomously performing the defragmentation operations for each of the subset of tablespaces.

6. The method of embodiment 1, further comprising:
   prior to the autonomously performing the defragmentation operations, analyzing, by the computer system, data objects stored in the plurality of tablespaces to generate fragmentation information corresponding to the plurality of tablespaces, wherein, for a given one of the plurality of tablespaces, the fragmentation information indicates an amount of fragmentation of the given tablespace;
wherein the selecting is performed based on the fragmentation information.

7. The method of embodiment 1, wherein the autonomously performing the defragmentation operations on the first tablespace further include:
recording, in a journal table, information corresponding to one or more data modifications made, during the defragmentation operations on the first tablespace, to a particular one of the first plurality of index objects in the first tablespace; and
subsequent to the rebuilding the first plurality of index objects, synchronizing the one or more data modifications to the rebuilt particular index object in the new first tablespace.

8. The method of embodiment 1, wherein the autonomously performing the defragmentation operations further includes:
prior to rebuilding a particular one of the first plurality of index objects, creating a logical lock on the particular index object such that the particular index object is not accessible to one or more maintenance jobs; and
subsequent to the rebuilding the particular index object in the new first tablespace, removing the logical lock on the particular index object.

9. The method of embodiment 1, wherein the autonomously performing the defragmentation operations further includes:
monitoring a number of active sessions executing on the computer system; and
in response to the number of active sessions exceeding a particular threshold value, terminating one or more of the active sessions.

10. The method of embodiment 1, wherein the autonomously performing the defragmentation operations further includes:
monitoring a number of user connections being blocked by the autonomously performing the defragmentation operations; and
in response to the number of user connections being blocked exceeding a particular threshold value, terminating the defragmentation operations.

11. A non-transitory, computer-readable medium having instructions stored thereon that are capable of being executed by a server system to cause operations comprising:
autonomously performing defragmentation operations for one or more of a plurality of tablespaces in a database, including by:
selecting a first tablespace, of the plurality of tablespaces, to defragment, wherein the first tablespace includes a first plurality of index objects;
creating a new first tablespace that is at least a same size as an in-use portion of the first tablespace;
rebuilding the first plurality of index objects, from the first tablespace, in the new first tablespace such that the rebuilt first plurality of index objects are stored in the new first tablespace without fragmentation;
while performing the defragmentation operations on the first tablespace, servicing a data access request associated with at least one of the first plurality of index objects; and
reclaiming storage space used to store at least a portion of the first tablespace.

12. The non-transitory, computer-readable medium of embodiment 11, wherein the operations further comprise:
prior to the performing the defragmentation operations, performing at least one of the following types of preliminary checks:
determining whether there is sufficient storage space available to perform the defragmentation operations;
verifying that the defragmentation operations are being performed during a period of decreased demand; and
determining whether any suspension windows are currently active; and
in response to a determination that one or more of the preliminary checks were unsuccessful, aborting the defragmentation operations.

13. The non-transitory, computer-readable medium of embodiment 11, wherein the selecting the first tablespace to defragment includes determining that the first tablespace has a largest amount of fragmented storage space of the plurality of tablespaces.

14. The non-transitory, computer-readable medium of embodiment 11, wherein the reclaiming the storage space includes deleting the first tablespace from the database such that the storage space used to store the first tablespace is made available to a database management system.

15. The non-transitory, computer-readable medium of embodiment 11, wherein the operations further comprise:
receiving, from a governance framework module, an indication that a suspension window is active for one or more of the first plurality of index objects; and
in response to the indication, automatically suspending the defragmentation operations on the first tablespace.

16. The non-transitory, computer-readable medium of embodiment 11, wherein the autonomously performing the defragmentation operations on the first tablespace further include:
recording, in a journal table, information corresponding to one or more data modifications made, during the defragmentation operations on the first tablespace, to a particular one of the first plurality of index objects in the first tablespace; and
subsequent to the rebuilding the first plurality of index objects, synchronizing the one or more data modifications to the rebuilt particular index object in the new first tablespace.

17. A system, comprising:
at least one processor; and
a non-transitory, computer-readable medium having instructions stored thereon that are executable by the at least one processor to cause the system to:
autonomously perform defragmentation operations for one or more of a plurality of tablespaces in a database, including by:
selecting a first tablespace, of the plurality of tablespaces, to defragment, wherein the first tablespace includes a first plurality of index objects;
creating a new first tablespace that is at least a same size as an in-use portion of the first tablespace;
rebuilding the first plurality of index objects, from the first tablespace, in the new first tablespace such that the rebuilt first plurality of index objects are stored in the new first tablespace without fragmentation;
while performing the defragmentation operations on the first tablespace, servicing a data access request associated with at least one of the first plurality of index objects; and
reclaiming storage space used to store at least a portion of the first tablespace.

18. The system of embodiment 17, wherein the instructions are further executable by the at least one processor to cause the system to:
  autonomously perform the defragmentation operations for a subset of the plurality of tablespaces in the database, wherein each of the subset of tablespaces have respective amounts of fragmentation that exceed a particular fragmentation threshold.
19. The system of embodiment 17, wherein the defragmentation operations further include:
  prior to rebuilding a particular one of the first plurality of index objects, creating a logical lock on the particular index object such that the particular index object is not accessible to one or more maintenance jobs; and
  subsequent to the rebuilding the particular index object in the new first tablespace, removing the logical lock on the particular index object.
20. The system of embodiment 17, wherein the instructions are further executable by the at least one processor to cause the system to:
  monitor a plurality of metrics associated with operations being performed on the database; and based on the monitoring, autonomously terminating one or more of the operations.

Database Defragmentation Using Autonomous Table Redefinition

21. A method, comprising:
  autonomously performing, by a computer system, defragmentation operations on one or more of a plurality of tables stored in a database, including by:
    based on fragmentation information corresponding to the plurality of tables, selecting a first table, of the plurality of tables, to defragment;
    copying data from the first table to an interim table such that the interim table is stored in the database without the fragmentation of the first table;
    monitoring the database to determine whether to interrupt the defragmentation operations on the first table;
    while performing the defragmentation operations on the first table, servicing one or more requests to perform a data modification operation on the first table; and
    subsequent to copying the data from the first table to the interim table, reclaiming storage space used to store the first table.
22. The method of embodiment 21, wherein the first table is stored in a first tablespace of the database, wherein the performing the defragmentation operation on the first table further includes creating the interim table in a second, different tablespace in the database.
23. The method of embodiment 21, wherein the first table includes a plurality of columns, wherein the autonomously performing the defragmentation operations on the first table includes:
  creating the interim table such that a data type of a first one of the plurality of columns is changed from a first data type to a second, different data type.
24. The method of embodiment 21, wherein the interim table is a partitioned table.
25. The method of embodiment 21, wherein the autonomously performing the defragmentation operations on the first table further includes:
  prior to copying the data from the first table to the interim table, creating a materialized view log based on the first table such that, for a given one of the one or more data modification operations serviced while performing the defragmentation operations on the first table, a corresponding entry is created in the materialized view log.
26. The method of embodiment 25, wherein the autonomously performing the defragmentation operations on the first table further includes:
  subsequent to the copying the data from the first table to the interim table,
  synchronizing the data in the interim table with the data in the first table using the materialized view log such that, after the synchronizing, the data in the interim table reflects the one or more data modification operations performed on the first table during the defragmentation operations.
27. The method of embodiment 21, wherein the selecting the first table to defragment includes determining that the first table has a highest percentage of fragmentation of the plurality of tables.
28. The method of embodiment 21, wherein the monitoring the database includes:
  monitoring a number of active sessions executing on the computer system; and
  in response to the number of active sessions exceeding a particular threshold value, terminating one or more of the active sessions.
29. The method of embodiment 21, wherein the monitoring the database includes:
  monitoring a number of user connections being blocked by the autonomously performing the defragmentation operations; and
  in response to the number of user connections being blocked exceeding a particular threshold value, terminating the defragmentation operations.
30. The method of embodiment 21, further comprising:
  prior to the autonomously performing the defragmentation operations, analyzing, by the computer system, the plurality of tables to generate the fragmentation information, wherein, for a given one of the plurality of tables, the fragmentation information indicates an amount of fragmentation of the given table.
31. A non-transitory, computer-readable medium having instructions stored thereon that are capable of being executed by a server system to cause operations comprising:
  autonomously performing defragmentation operations on one or more of a plurality of tables stored in a database, including by:
    based on fragmentation information corresponding to the plurality of tables, selecting a first table, of the plurality of tables, to defragment;
    copying data from the first table to an interim table such that the interim table is stored in the database without the fragmentation of the first table;
    monitoring the database to determine whether to interrupt the defragmentation operations on the first table;
    while performing the defragmentation operations on the first table, servicing one or more requests to perform data modification operations on the first table; and
    subsequent to copying the data from the first table to the interim table, reclaiming storage space used to store the first table.
32. The non-transitory, computer-readable medium of embodiment 31, wherein the autonomously performing the defragmentation operations on the first table further includes:
  prior to copying the data from the first table to the interim table, creating a materialized view log based on the first table such that, for a given one of the one or more data modification operations serviced while performing the defragmentation operations on the first table, a corresponding entry is created in the materialized view log; and synchronizing the data in the interim table with the data in the first table using the materialized view log.

33. The non-transitory, computer-readable medium of embodiment 31, wherein the autonomously performing the defragmentation operations further includes:

prior to the copying the data from the first table to the interim table, creating a logical lock on the first table such that the first table is not accessible to one or more maintenance jobs; and subsequent to the copying the data from the first table to the interim table, removing the logical lock on the first table.

34. The non-transitory, computer-readable medium of embodiment 31, wherein the selecting the first table to defragment includes determining that the first table has a largest amount of fragmented storage space of the plurality of tables.

35. The non-transitory, computer-readable medium of embodiment 31, wherein the operations further comprise:

prior to the autonomously performing the defragmentation operations, performing at least one of the following types of preliminary checks:

determining whether there is sufficient storage space available to perform the defragmentation operations;

verifying that the defragmentation operations are being performed during a period of decreased demand; and determining whether any suspension windows are currently active; and in response to a determination that one or more of the preliminary checks were unsuccessful, aborting the defragmentation operations.

36. The non-transitory, computer-readable medium of embodiment 31, wherein the operations further comprise:

prior to the autonomously performing the defragmentation operations, analyzing the plurality of tables to generate the fragmentation information, wherein, for a given one of the plurality of tables, the fragmentation information indicates an amount of fragmentation of the given table.

37. A system, comprising:

at least one processor; and a non-transitory, computer-readable medium having instructions stored thereon that are executable by the at least one processor to cause the system to:

autonomously perform defragmentation operations on one or more of a plurality of tables stored in a database, including by:

based on fragmentation information corresponding to the plurality of tables, selecting a first table, of the plurality of tables, to defragment;

copying data from the first table to an interim table such that the interim table is stored in the database without the fragmentation of the first table;

monitoring the database to determine whether to interrupt the defragmentation operations on the first table;

while performing the defragmentation operations on the first table, servicing one or more requests to perform data modification operations on the first table; and subsequent to copying the data from the first table to the interim table, reclaiming storage space used to store the first table.

38. The system of embodiment 37, wherein the instructions are further executable by the at least one processor to cause the system to:

autonomously perform the defragmentation operations on each of a subset of the plurality of tables for which an amount of fragmentation exceeds a particular fragmentation threshold.

39. The system of embodiment 38, wherein the autonomously performing the defragmentation operations includes performing the defragmentation operations on the subset of tables in order from most fragmented to least fragmented.

40. The system of embodiment 37, wherein the monitoring the database includes at least one of:

monitoring a number of user connections being blocked by the autonomously performing the defragmentation operations; and monitoring a number of active sessions executing on the system.

What is claimed is:

1. A method, comprising:

autonomously performing, by a computer system, defragmentation operations for one or more of a plurality of tablespaces in a database, including by:

selecting a first tablespace, of the plurality of tablespaces, to defragment, wherein the first tablespace includes a first plurality of index objects;

creating a new first tablespace that is at least a same size as an in-use portion of the first tablespace;

prior to rebuilding the first plurality of index objects in the new first tablespace, creating a journal table for recording data modification operations performed on the first tablespace while performing the defragmentation operations on the first tablespace;

rebuilding the first plurality of index objects, from the first tablespace, in the new first tablespace such that the rebuilt first plurality of index objects are stored in the new first tablespace without fragmentation;

while performing the defragmentation operations on the first tablespace, servicing a data access request associated with at least one of the first plurality of index objects; and reclaiming storage space used to store at least a portion of the first tablespace.

2. The method of claim 1, wherein the reclaiming the storage space includes deleting the first tablespace from the database such that the storage space used to store the first tablespace is made available to a database management system.

3. The method of claim 1, wherein the reclaiming the storage space includes releasing the storage space such that it may be used to store other database objects in the new first tablespace.

4. The method of claim 1, wherein the selecting the first tablespace to defragment includes determining that the first tablespace has a highest percentage of fragmentation of the plurality of tablespaces.

5. The method of claim 1, wherein a subset of the plurality of tablespaces have respective amounts of fragmentation that exceed a particular fragmentation threshold, wherein the method further comprises autonomously performing the defragmentation operations for each of the subset of tablespaces.

6. The method of claim 1, further comprising:

prior to the autonomously performing the defragmentation operations, analyzing, by the computer system, data objects stored in the plurality of tablespaces to generate fragmentation information corresponding to the plurality of tablespaces, wherein, for a given one of the plurality of tablespaces, the fragmentation information indicates an amount of fragmentation of the given tablespace;

wherein the selecting is performed based on the fragmentation information.

7. The method of claim 1, wherein the autonomously performing the defragmentation operations further includes:
prior to rebuilding a particular one of the first plurality of index objects, creating a logical lock on the particular index object such that the particular index object is not accessible to one or more maintenance jobs; and
subsequent to the rebuilding the particular index object in the new first tablespace, removing the logical lock on the particular index object.

8. The method of claim 1, wherein the autonomously performing the defragmentation operations further includes:
monitoring a number of active sessions executing on the computer system; and
in response to the number of active sessions exceeding a particular threshold value, terminating one or more of the active sessions.

9. The method of claim 1, wherein the autonomously performing the defragmentation operations further includes:
monitoring a number of user connections being blocked by the autonomously performing the defragmentation operations; and
in response to the number of user connections being blocked exceeding a particular threshold value, terminating the defragmentation operations.

10. The method of claim 1, wherein the autonomously performing the defragmentation operations further includes:
monitoring an average response time to service data access requests to one or more applications executing on the computer system; and
in response to the average response time exceeding a particular threshold value, terminating the defragmentation operations.

11. The method of claim 1, wherein autonomously performing the defragmentation operations for the first tablespace further includes:
subsequent to the rebuilding the first plurality of index objects in the new first tablespace, synchronizing, based on the journal table, the data modification operations performed on the first plurality of index objects with the rebuilt first plurality of index objects such that, after the synchronizing, the rebuilt first plurality of index objects reflects the data modification operations performed on the first plurality of index objects during the defragmentation operations.

12. A non-transitory, computer-readable medium having instructions stored thereon that are capable of being executed by a server system to cause operations comprising:
autonomously performing defragmentation operations for one or more of a plurality of tablespaces in a database, including by:
selecting a first tablespace, of the plurality of tablespaces, to defragment, wherein the first tablespace includes a first plurality of index objects;
creating a new first tablespace that is at least a same size as an in-use portion of the first tablespace;
prior to rebuilding the first plurality of index objects in the new first tablespace, creating a journal table for recording data modification operations performed on the first tablespace while performing the defragmentation operations on the first tablespace;
rebuilding the first plurality of index objects, from the first tablespace, in the new first tablespace such that the rebuilt first plurality of index objects are stored in the new first tablespace without fragmentation;
while performing the defragmentation operations on the first tablespace, servicing a data access request associated with at least one of the first plurality of index objects; and
reclaiming storage space used to store at least a portion of the first tablespace.

13. The non-transitory, computer-readable medium of claim 12, wherein the operations further comprise:
prior to the performing the defragmentation operations, performing at least one of the following types of preliminary checks:
determining whether there is sufficient storage space available to perform the defragmentation operations;
verifying that the defragmentation operations are being performed during a period of decreased demand; and
determining whether any suspension windows are currently active; and
in response to a determination that one or more of the preliminary checks were unsuccessful, aborting the defragmentation operations.

14. The non-transitory, computer-readable medium of claim 12, wherein the selecting the first tablespace to defragment includes determining that the first tablespace has a largest amount of fragmented storage space of the plurality of tablespaces.

15. The non-transitory, computer-readable medium of claim 12, wherein the reclaiming the storage space includes deleting the first tablespace from the database such that the storage space used to store the first tablespace is made available to a database management system.

16. The non-transitory, computer-readable medium of claim 12, wherein the operations further comprise:
receiving, from a governance framework module, an indication that a suspension window is active for one or more of the first plurality of index objects; and
in response to the indication, automatically suspending the defragmentation operations on the first tablespace.

17. The non-transitory, computer-readable medium of claim 12, wherein the autonomously performing the defragmentation operations on the first tablespace further include:
monitoring an average response time to service data access requests to one or more applications executing on the server system; and
in response to the average response time exceeding a particular threshold value, terminating the defragmentation operations.

18. A method, comprising:
autonomously performing, by a computer system, defragmentation operations on one or more of a plurality of tables stored in a database, including by:
based on fragmentation information corresponding to the plurality of tables, selecting a first table, of the plurality of tables, to defragment;
prior to copying data from the first table to an interim table, creating a materialized view log based on the first table such that, for a given one of one or more data modification operations serviced while performing the defragmentation operations on the first table, a corresponding entry is created in the materialized view log;
copying the data from the first table to the interim table such that the interim table is stored in the database without the fragmentation of the first table;

monitoring the database to determine whether to interrupt the defragmentation operations on the first table;

while performing the defragmentation operations on the first table, servicing one or more requests to perform a data modification operation on the first table; and subsequent to copying the data from the first table to the interim table, reclaiming storage space used to store the first table.

19. The method of claim 18, wherein the autonomously performing the defragmentation operations on the first table further includes:

subsequent to the copying the data from the first table to the interim table, synchronizing the data in the interim table with the data in the first table using the materialized view log such that, after the synchronizing, the data in the interim table reflects the one or more data modification operations performed on the first table during the defragmentation operations.

20. The method of claim 18, wherein the selecting the first table to defragment includes determining that the first table has a highest percentage of fragmentation of the plurality of tables.

\* \* \* \* \*